United States Patent
Kokuryou et al.

(10) Patent No.: US 10,106,954 B2
(45) Date of Patent: Oct. 23, 2018

(54) CONSTRUCTION MACHINE

(71) Applicant: Hitachi Construction Machinery Tierra Co., Ltd., Koka-shi, Shiga (JP)

(72) Inventors: Osamu Kokuryou, Koka (JP); Junya Kawamoto, Moriyama (JP); Masaya Ueda, Konan (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 0 days.

(21) Appl. No.: 14/915,689

(22) PCT Filed: Dec. 8, 2014

(86) PCT No.: PCT/JP2014/082407
§ 371 (c)(1),
(2) Date: Mar. 1, 2016

(87) PCT Pub. No.: WO2015/125380
PCT Pub. Date: Aug. 27, 2015

(65) Prior Publication Data
US 2016/0369478 A1    Dec. 22, 2016

(30) Foreign Application Priority Data

Feb. 24, 2014  (JP) ................. 2014-032860

(51) Int. Cl.
*B60K 11/04* (2006.01)
*E02F 9/08* (2006.01)
(Continued)

(52) U.S. Cl.
CPC ............ *E02F 9/0866* (2013.01); *B60K 11/04* (2013.01); *E02F 3/325* (2013.01); *F01P 5/04* (2013.01);
(Continued)

(58) Field of Classification Search
CPC ......... B60K 11/00; B60K 11/04; B60K 11/06; B60K 11/08
See application file for complete search history.

(56) References Cited

U.S. PATENT DOCUMENTS 7,134,518 B2 * 11/2006 Arai ................. B60K 11/04
                                                180/68.1
7,603,968 B2 * 10/2009 Pantow ................. B60K 11/02
                                                123/41.04

(Continued)

FOREIGN PATENT DOCUMENTS

CN          1676784 A      10/2005
CN         101177120 A      5/2008
(Continued)

OTHER PUBLICATIONS

Extended European Search Report issued in counterpart European Application No. 14883398.1 dated Oct. 9, 2017 (seven pages).
(Continued)

*Primary Examiner* — James A Shriver, II
*Assistant Examiner* — Vaughn Coolman
(74) *Attorney, Agent, or Firm* — Crowell & Moring LLP

(57) ABSTRACT

A heat exchanging device includes a frame member assembled having a square frame shape by using a lower frame extending in a front and rear direction and mounted on a revolving frame, side frames extending to an upper side from both ends of the lower frame, and an upper frame extending on an upper part of the side frames. A cooling fan is disposed in a state in which each of the blades enters into the frame member from an engine side end surface with respect to the frame member. An oil cooler and a radiator are mounted on a mounting surface plate on an opposite side to the engine and interposing said cooling fan at an interval from the cooling fan with respect to the frame member. A flat plate shaped shroud surrounding each of the blades of the
(Continued)

cooling fan and forming a fan accommodating chamber among the frame member, the oil cooler, and the radiator is mounted on the engine side end surface of the frame member.

2 Claims, 17 Drawing Sheets

(51) Int. Cl.
    *F01P 11/10*     (2006.01)
    *E02F 3/32*     (2006.01)
    *F01P 5/04*     (2006.01)
    *F01P 11/08*     (2006.01)
    *F15B 11/08*     (2006.01)
    *E02F 3/96*     (2006.01)

(52) U.S. Cl.
    CPC ............... *F01P 11/08* (2013.01); *F01P 11/10* (2013.01); *F15B 11/08* (2013.01); *B60Y 2200/412* (2013.01); *E02F 3/964* (2013.01)

(56) References Cited

U.S. PATENT DOCUMENTS

| | | | | |
|---|---|---|---|---|
| 8,505,499 | B2* | 8/2013 | Hirasawa | B60K 11/04 123/41.01 |
| 9,540,788 | B2* | 1/2017 | Naito | B60K 1/00 |
| 2001/0007292 | A1* | 7/2001 | Yabf | E02F 9/0866 180/68.1 |
| 2002/0104491 | A1* | 8/2002 | Izumi | E02F 9/00 123/41.49 |
| 2005/0210718 | A1* | 9/2005 | Ueda | E02F 9/0808 37/466 |
| 2009/0199553 | A1* | 8/2009 | Nishimura | E02F 9/2292 60/486 |
| 2009/0242311 | A1* | 10/2009 | Fujita | B62D 33/0617 180/291 |
| 2011/0219762 | A1* | 9/2011 | Kobayashi | B60K 11/08 60/456 |
| 2012/0227943 | A1* | 9/2012 | Nakashima | E02F 9/0866 165/121 |
| 2013/0075171 | A1* | 3/2013 | Noguchi | B60K 11/06 180/65.1 |
| 2014/0301816 | A1* | 10/2014 | Kokuryo | B60K 11/04 414/687 |
| 2016/0168821 | A1* | 6/2016 | Naito | B60K 1/00 180/65.21 |
| 2017/0058485 | A1* | 3/2017 | Yoshino | E02F 9/0883 |
| 2017/0067227 | A1* | 3/2017 | Ota | B60K 1/00 |

FOREIGN PATENT DOCUMENTS

| | | | |
|---|---|---|---|
| CN | 101780762 A | 7/2010 | |
| EP | 2 840 190 A2 | 2/2015 | |
| JP | 10-331657 | * 12/1998 | ............. B60K 11/04 |
| JP | 2004-218510 A | 8/2004 | |
| JP | 2009-19585 A | 1/2009 | |
| JP | 2013-002236 A | 1/2013 | |

OTHER PUBLICATIONS

Chinese Office Action issued in counterpart Chinese Application No. 201480047628.5 dated Feb. 6, 2017 (seven pages).

* cited by examiner

CONSTRUCTION MACHINE

TECHNICAL FIELD

The present invention relates to a construction machine such as a hydraulic excavator and particularly to a construction machine provided with a heat exchanging device for cooling an hydraulic oil, engine coolant and the like.

BACKGROUND ART

In general, a construction machine such as a hydraulic excavator as a typical example of a construction machine is constituted by an automotive lower traveling structure, an upper revolving structure rotatably mounted on the lower traveling structure and a working mechanism provided on a front side of the upper revolving structure, capable of moving upward/downward.

Here, the hydraulic excavator includes a small-sized hydraulic excavator for performing a work in a narrow work site or the like. For example, this small-sized hydraulic excavator is called a super small turning type or a rear super small turning type and is formed in a compact manner so that at least a rear side is substantially accommodated in a vehicle width of the lower traveling structure when the upper revolving structure performs a turning operation.

The upper revolving structure of the small-sized hydraulic excavator has a revolving frame forming a support structural body, an engine mounted in a laterally placed state extending in the left and right direction on the rear side of the revolving frame, a cooling fan having a plurality of blades around a hub member located on one side of the engine in the left and right direction and mounted on an output shaft of the engine and generating cooling air by being driven by the engine, a hydraulic pump provided on the other side of the engine in the left and right direction and supplying the hydraulic oil to a hydraulic actuator by being driven by the engine, and a heat exchanging device including an oil cooler provided on the revolving frame so as to face the cooling fan and cooling the hydraulic oil and a radiator for cooling coolant of the engine (Patent Document 1).

Here, the heat exchanging device is constituted to surround the cooling fan by providing a shroud so that the cooling air by the cooling fan can be sufficiently supplied to the oil cooler and the radiator. In this case, an arrangement relation among the cooling fan, the oil cooler, and the radiator is made such that the cooling fan is arranged at a position away from the oil cooler and the radiator by a predetermined dimension so that the rotating cooling fan does not interfere with the oil cooler and the radiator and also the cooling air by the cooling fan is supplied to the entirety of the oil cooler and the radiator (Patent Document 2).

PRIOR ART DOCUMENT

Patent Document

Patent Document 1: Japanese Patent Laid-Open No. 2013-2236 A
Patent Document 2: Japanese Patent Laid-Open No. 2004-218510 A

SUMMARY OF THE INVENTION

Incidentally, in the heat exchanging device according to Patent Document 2, since the oil cooler and the radiator are arranged at the position away from the cooling fan by the predetermined dimension, the shroud is formed having a box shape and is constituted to cover a space among the cooling fan, the oil cooler, and the radiator so that the ambient air is not sucked from the space among the cooling fan, the oil cooler, and the radiator.

Therefore, in addition to an increase of sizes of the heat exchanging device together with the shroud, the shape of the shroud becomes complicated, and a weight of the heat exchanging device is increased. Moreover, there is a problem that the shroud having the complicated shape increases a manufacturing cost and moreover, lowers assembling workability and maintenance workability.

The present invention is made in view of a problem of the aforementioned conventional art, and an object of the present invention is to provide a construction machine capable of reducing the size of the heat exchanging device and improving the assembling workability and maintenance workability by simplifying the shape of the shroud.

(1) A construction machine according to the present invention comprising: an automotive lower traveling structure; an upper revolving structure rotatably mounted on the lower traveling structure; and a working mechanism provided on a front side of the upper revolving structure, capable of moving upward/downward; wherein the upper revolving structure comprises: a revolving frame forming a support structural body; an engine mounted on a rear side of the revolving frame in a laterally placed state extending in a left and right direction; a cooling fan having a plurality of blades around a hub member located on one side of the engine in the left and right direction and mounted on an output shaft of the engine and generating cooling air by being driven by the engine; a hydraulic pump provided on the other side of the engine in the left and right direction and supplying hydraulic oil to a hydraulic actuator by being driven by the engine; and a heat exchanging device including an oil cooler provided on the revolving frame so as to face the cooling fan and cooling the hydraulic oil, and a radiator for cooling coolant of the engine.

In order to solve the aforementioned problems, a characteristic of the configuration adopted by the present invention is that the heat exchanging device includes a frame member assembled having a square frame shape by using a lower frame located on a lower side, extending in a front and rear direction of the upper revolving structure and mounted on the revolving frame, a pair of side frames extending to an upper side from both ends of the lower frame in a length direction, and an upper frame extending in the front and rear direction on an upper part of each of the side frames; the cooling fan is disposed in a state in which each of the blades enters into the frame member from an end surface on the engine side with respect to the frame member; the oil cooler and the radiator are mounted on an opposite side to the engine interposing the cooling fan with respect to the frame member; and a flat plate shaped shroud surrounding an outer periphery of each of the blades of the cooling fan and forming a fan accommodating chamber among the frame member, the oil cooler, and the radiator is provided on the engine side end surface of the frame member.

With this arrangement, the shroud can prevent interference among the cooling fan, the oil cooler, and the radiator and moreover, can supply the cooling air by the cooling fan to the entireties of the oil cooler and the radiator.

Therefore, it is only necessary that the shroud has a shape that can cover a gap between the cooling fan and the frame member, and the shroud can be formed of a simple flat plate shape. As a result, since the shape of the shroud is simplified, the size, the weight, and the manufacturing cost of the heat exchanging device can be reduced, and moreover, assembling workability, the maintenance workability and the like can be improved.

(2) According to the present invention, it is configured such that the shroud is formed as a rectangular plate body having a circular opening for surrounding the cooling fan, and a periphery of the shroud is detachably attached to the engine side end surface of the frame member.

With this arrangement, the shroud can be easily formed only by machining the circular opening for surrounding the cooling fan in the rectangular plate body. Moreover, since the shroud has its periphery detachably attached to the frame member, cleaning works and inspection works of the oil cooler and the radiator, a replacement work of a fan belt or the like rounded to the output shaft of the engine can be performed easily.

(3) According to the present invention, it is configured such that a support member formed of a housing support base extending on an upper side of the engine in the left and right direction and formed of front and rear leg parts each having an upper end mounted at a position on the other side of the housing support base in the left and right direction and a lower end mounted on the revolving frame across the engine in the front and rear direction is provided on the revolving frame; and the housing support base of the support member having one side which is a free end in the left and right direction is mounted on the frame member of the heat exchanging device.

With this arrangement, since the frame member of the heat exchanging device supports the oil cooler and the radiator, it has rigidity and can support a heavy article. On this point, the support member is constituted to have the free end of its housing support base mounted on the frame member of the heat exchanging device. Therefore, even if the leg part on the one side in the left and right direction is omitted and each of the leg part is provided only on the other side in the left and right direction, the support member can stably support the housing support base in the state supported on the both sides by each of the leg part on the other side and the frame member on the one side by using the frame member of the heat exchanging device.

As a result, when the support member is to be mounted on the revolving frame, each of the leg part located on the other side in the left and right direction is mounted on the revolving frame, and the free end (one side) of the housing support base is mounted on the frame member of the heat exchanging device. Only by this work, the support member can be mounted on the revolving frame. As a result, the number of work processes when the support member is mounted on the revolving frame can be reduced, and assembling workability can be improved. Moreover, the installation space on the revolving frame can be effectively used for a portion of omission of the leg part on one side in the left and right direction, and the size of the upper revolving structure can be reduced. Furthermore, since the weight of the support member can be reduced for a portion of omission of the leg part on one side, the weight of the construction machine can be reduced.

MODE FOR CARRYING OUT THE INVENTION

Hereinafter, a small-sized hydraulic excavator provided with an oil cooler and a radiator in a heat exchanging device is used as a typical example of a construction machine according to an embodiment of the present invention will be described in detail in accordance with FIGS. 1 to 17. In this embodiment, a hydraulic excavator of a canopy type provided with a canopy covering an upper side of an operator's seat is exemplified.

Figure 1:
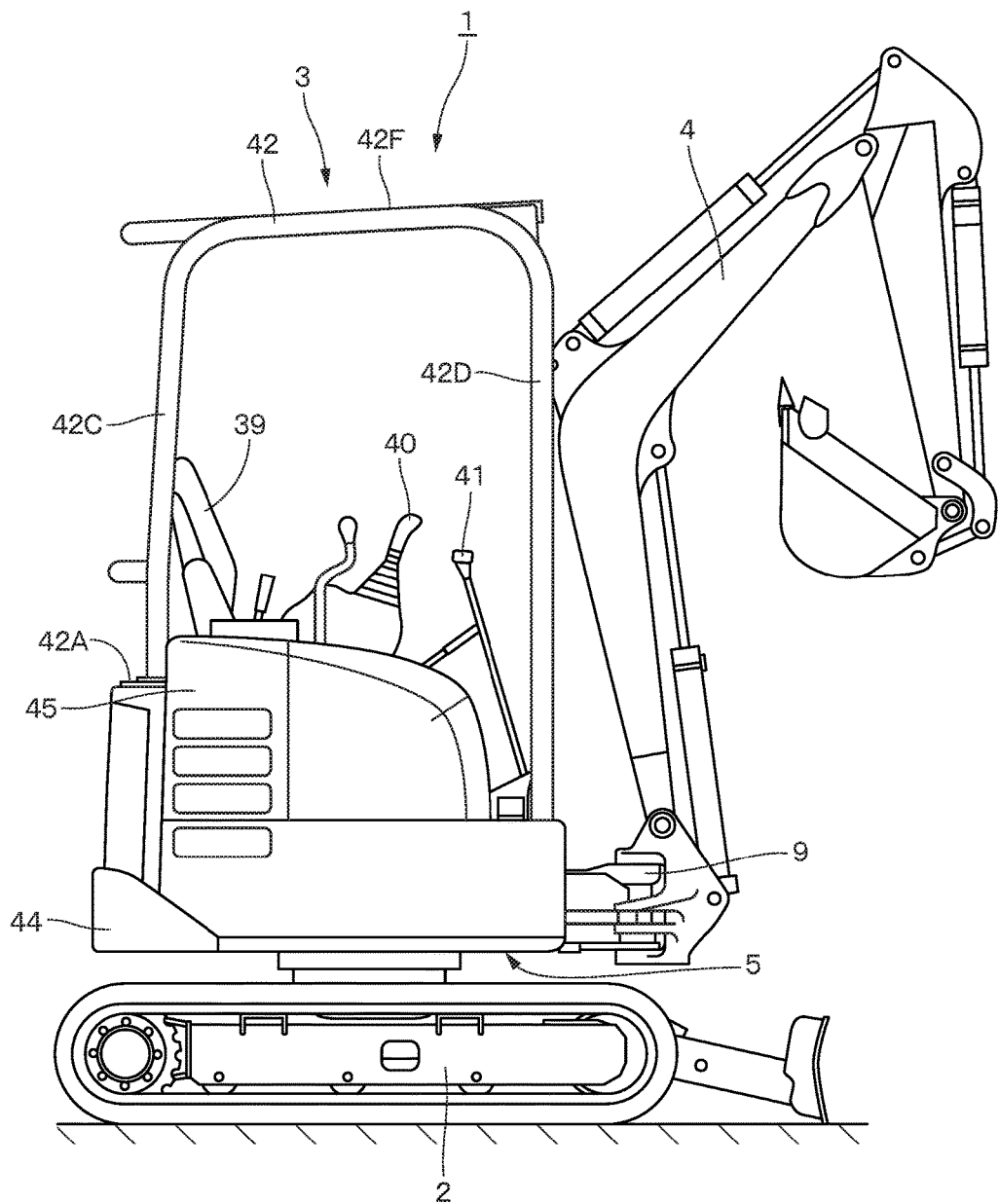
FIG. 1 is a front view showing a hydraulic excavator of a canopy type according to the embodiment of the present invention.

In FIG. 1, the hydraulic excavator 1 is formed as a crawler-type construction machine according to this embodiment. This hydraulic excavator 1 is a small-sized hydraulic excavator called a mini shovel. The hydraulic excavator 1 is constituted by an automotive lower traveling structure 2, an upper revolving structure 3 rotatably mounted on the lower traveling structure 2, and a working mechanism 4 provided on a front side of the upper revolving structure 3 in a front and rear direction, capable of moving upward/downward and performing an excavating work of earth and sand.

The upper revolving structure 3 includes a revolving frame 5 which will be described later, an engine 16, a cooling fan 17, a hydraulic pump 18, a heat exchanging device 19, and a support member 33.

Figure 9:
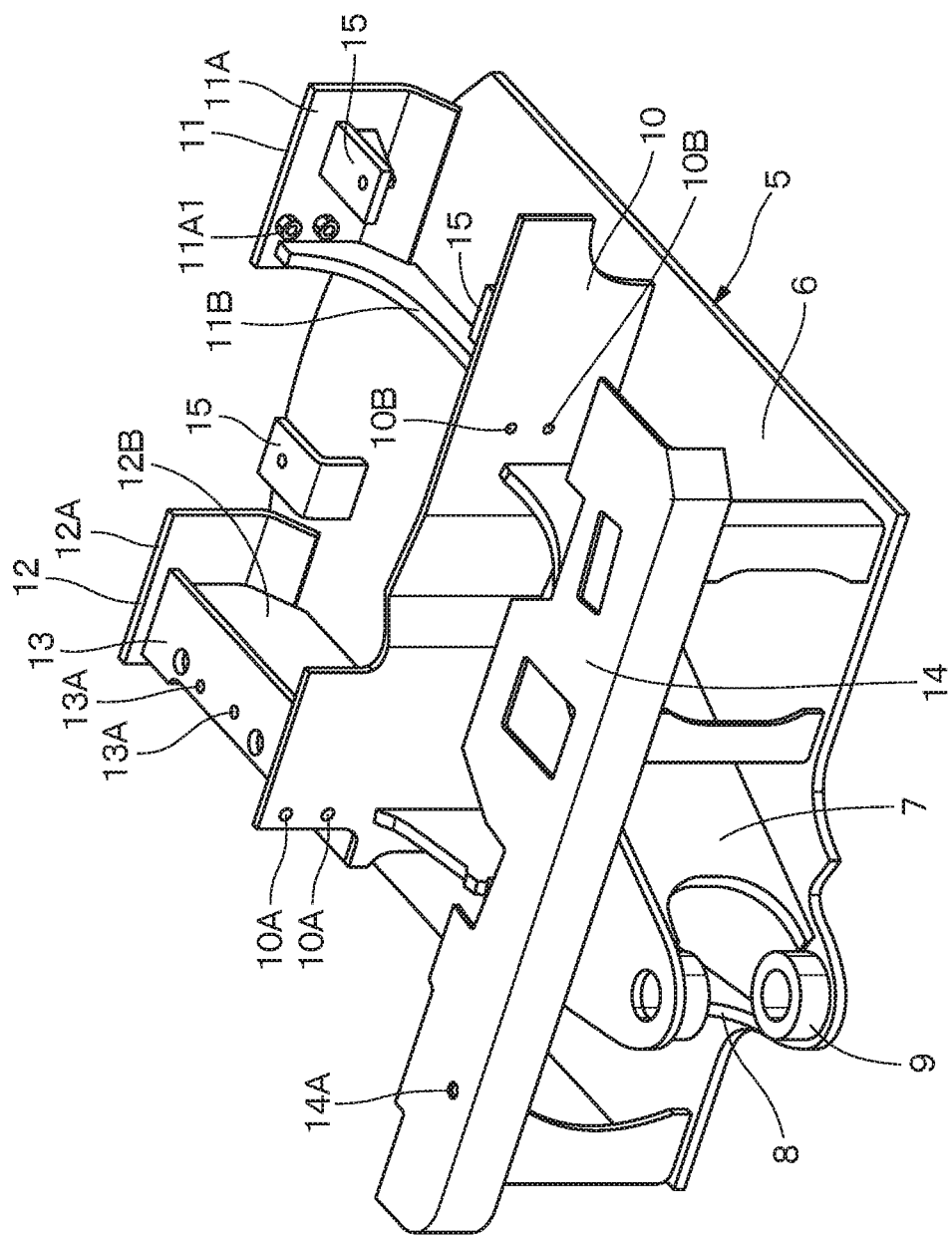
FIG. 9 is a perspective view of a single body of the revolving frame seen from the left front side.

The revolving frame 5 is rotatably mounted on the lower traveling structure 2 and formed as a support structural body which is a major part of the upper revolving structure 3. As shown in FIG. 9, the revolving frame 5 is constituted by a rectangular bottom plate 6 formed of a thick flat plate, a left front vertical plate 7 and a right front vertical plate 8 installed upright having a substantial V-shape away from each other in a left and right direction on an upper surface side of the bottom plate 6, a support bracket 9 provided on a front end part of each of the front vertical plates 7 and 8 and supporting the working mechanism 4, a partition plate 10 extending in the left and right direction at a rear end position of each of the front vertical plates 7 and 8 and installed upright on the bottom plate 6, a left rear vertical plate 11 installed upright so as to continue to a rear side of the left front vertical plate 7 interposing the partition plate 10, a right rear vertical plate 12 installed upright so as to continue to a rear side of the right front vertical plate 8 interposing the partition plate 10, a heat exchanging device mounting base 13 provided on an upper side of the right rear vertical plate 12 by extending in the front and rear direction, a floor mounting member 14 located on the front side of the bottom plate 6 and provided by extending on the upper side of each of the front vertical plates 7 and 8 in the left and right direction, and a plurality, for example, four, engine brackets 15 (only three are shown) located on the rear side of the bottom plate 6 and provided on the bottom plate 6, the partition plate 10, and the left rear vertical plate 11.

A plurality of, for example, two, bolt insertion holes 10A located on a right side in the left and right direction are provided in the partition plate 10 at an interval in a vertical direction. These two bolt insertion holes 10A are for insertion of a frame member fixing bolt 27D for fixing a front side frame 22 of a frame member 20 constituting the below-described heat exchanging device 19 to the partition plate 10.

On the other hand, at a position of the partition plate 10 closer to the left side, a plurality of, for example, two, female screw holes 10B located in the vicinity of the left rear vertical plate 11 at an interval in a vertical direction. This female screw hole 10B is formed by welding a nut coaxially with a through hole drilled in the partition plate 10, for example (so-called weld nut). Other than that, as the female screw hole 10B, a female screw (thread) may be directly threaded on the partition plate 10. The support member fixing bolt 37 for fixing a left front leg part 35 of the support member 33 which will be described later to the partition plate 10 is screwed with this female screw hole 10B.

The left rear vertical plate 11 is constituted by a left rear end plate 11A installed upright on a rear end portion of the bottom plate 6 so as to face the partition plate 10 in the front and rear direction and a left vertical plate member 11B installed upright by extending between the partition plate 10 and the left rear end plate 11A in the front and rear direction. A plurality of, for example, two, female screw holes 11A1 located in the vicinity of the left side of the left vertical plate member 11B are provided in the left rear end plate 11A at an interval in the vertical direction. This female screw hole 11A1 is formed by a weld nut, for example, similarly to the female screw hole 10B of the partition plate 10 described above. The support member fixing bolt 37 for fixing the left rear leg part 36 of the support member 33 to the left rear vertical plate 11 is screwed with these two female screw holes 11A1.

The right rear vertical plate 12 is constituted by a right rear end plate 12A installed upright on the rear end portion of the bottom plate 6 so as to face the partition plate 10 in the front and rear direction and a right vertical plate member 12B installed upright by extending between the partition plate 10 and the right rear end plate 12A in the front and rear direction.

The heat exchanging device mounting base 13 is formed as a lengthy plate body mounted by extending on the right vertical plate member 12B of the right rear vertical plate 12 by extending in the front and rear direction. In this heat exchanging device mounting base 13, a plurality of, for example, four, bolt insertion holes 13A are provided by penetrating in the vertical direction at an interval in the front and rear direction.

The floor mounting member 14 constitutes a base on which a front side portion of the floor member 38 which will be described later and a right front column 42D of a canopy 42 are mounted. A female screw hole 14A in which a canopy fixing bolt 43 for fixing the right front column 42D, which will be described later is screwed is provided on a right side position of the floor mounting member 14.

Moreover, each of the engine brackets 15 is arranged at a desired interval dimension in the front and rear direction and in the left and right direction. Each of the engine brackets 15 elastically supports the engine 16 through an anti-vibration mount 16A which will be described later.

Figure 3:
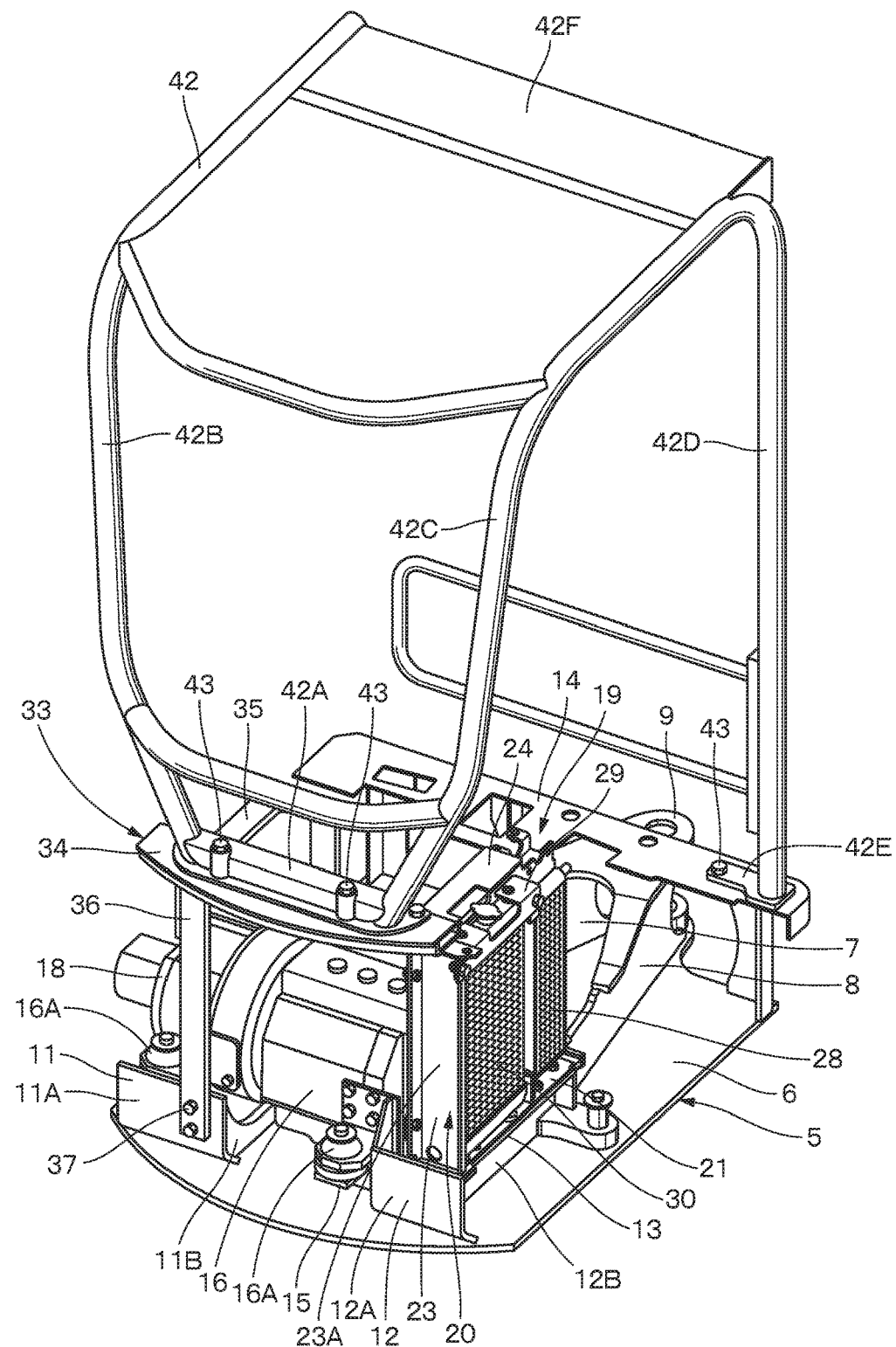
FIG. 3 is a perspective view of a state in which an engine, a heat exchanging device, a support member and a canopy are mounted on a revolving frame seen from a right rear side.
Figure 4:
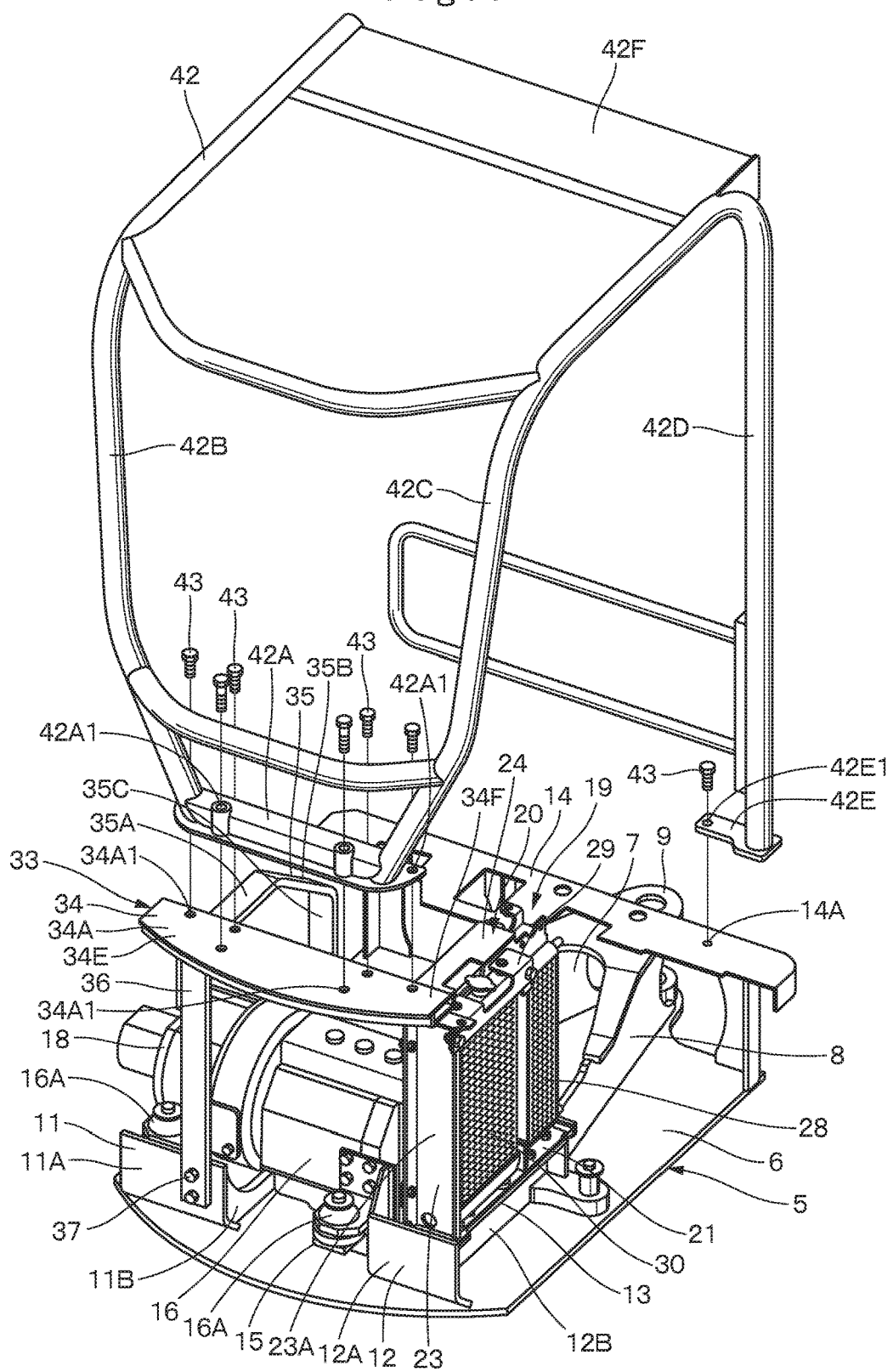
FIG. 4 is an exploded perspective view of a state in which the canopy is separated from the revolving frame and the support member taken from a similar position to that of FIG. 3.
Figure 6:
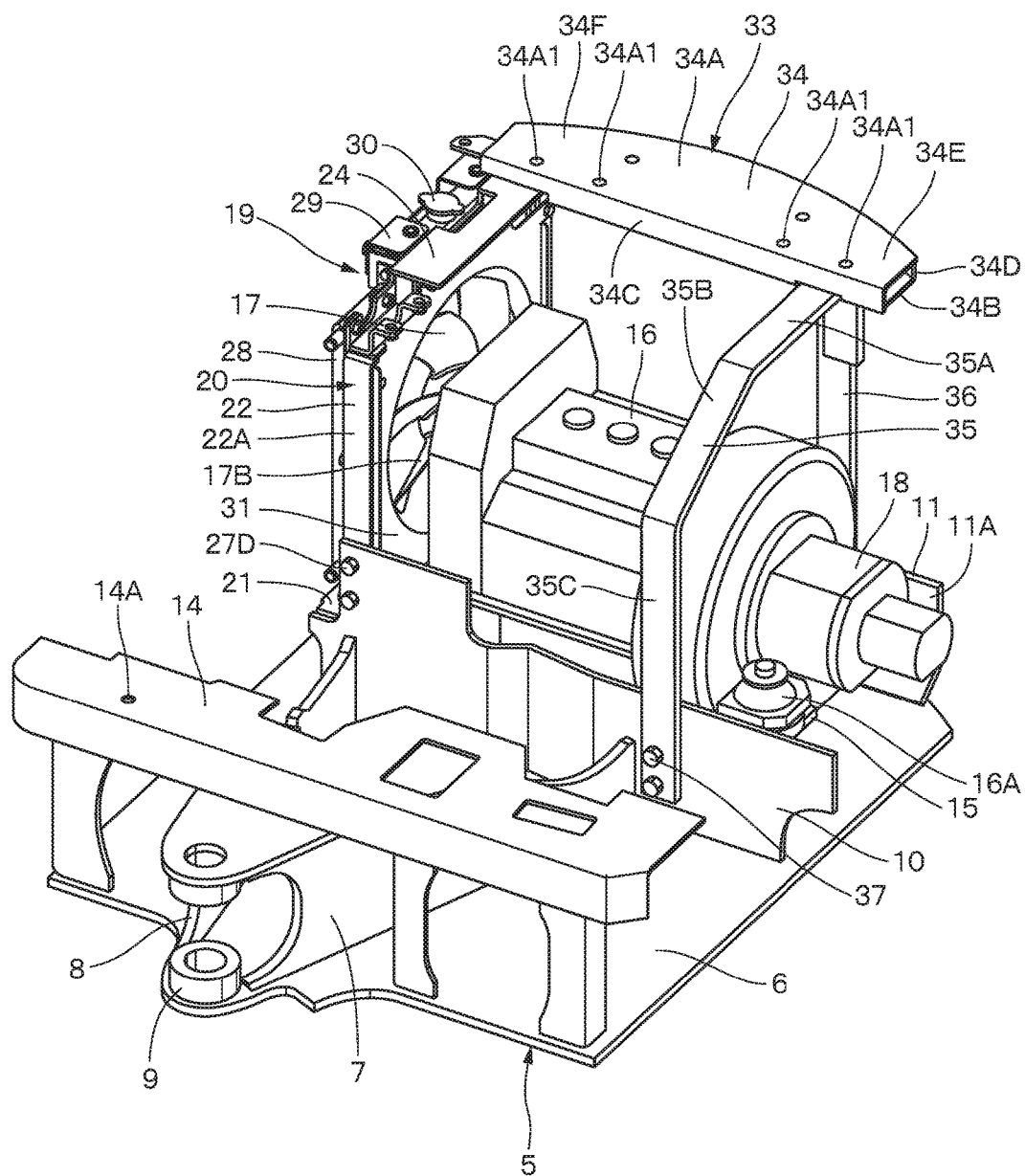
FIG. 6 is a perspective view of a state in which the floor member is removed from the revolving frame taken from a similar position to that of FIG. 5.

As shown in FIGS. 3, 4, and 6, the engine 16 is provided on the rear side of the revolving frame 5, and the engine 16 is arranged in a laterally placed state extending between the partition plate 10 and the rear end plates 11A and 12A of each of the rear vertical plates 11 and 12 in the left and right direction. The engine 16 is mounted on each of the engine brackets 15 in an anti-vibration state through the anti-vibration mount 16A. The below-described cooling fan 17 located on one side in the left and right direction, for example, on the right side is provided on this engine 16.

Figure 11:
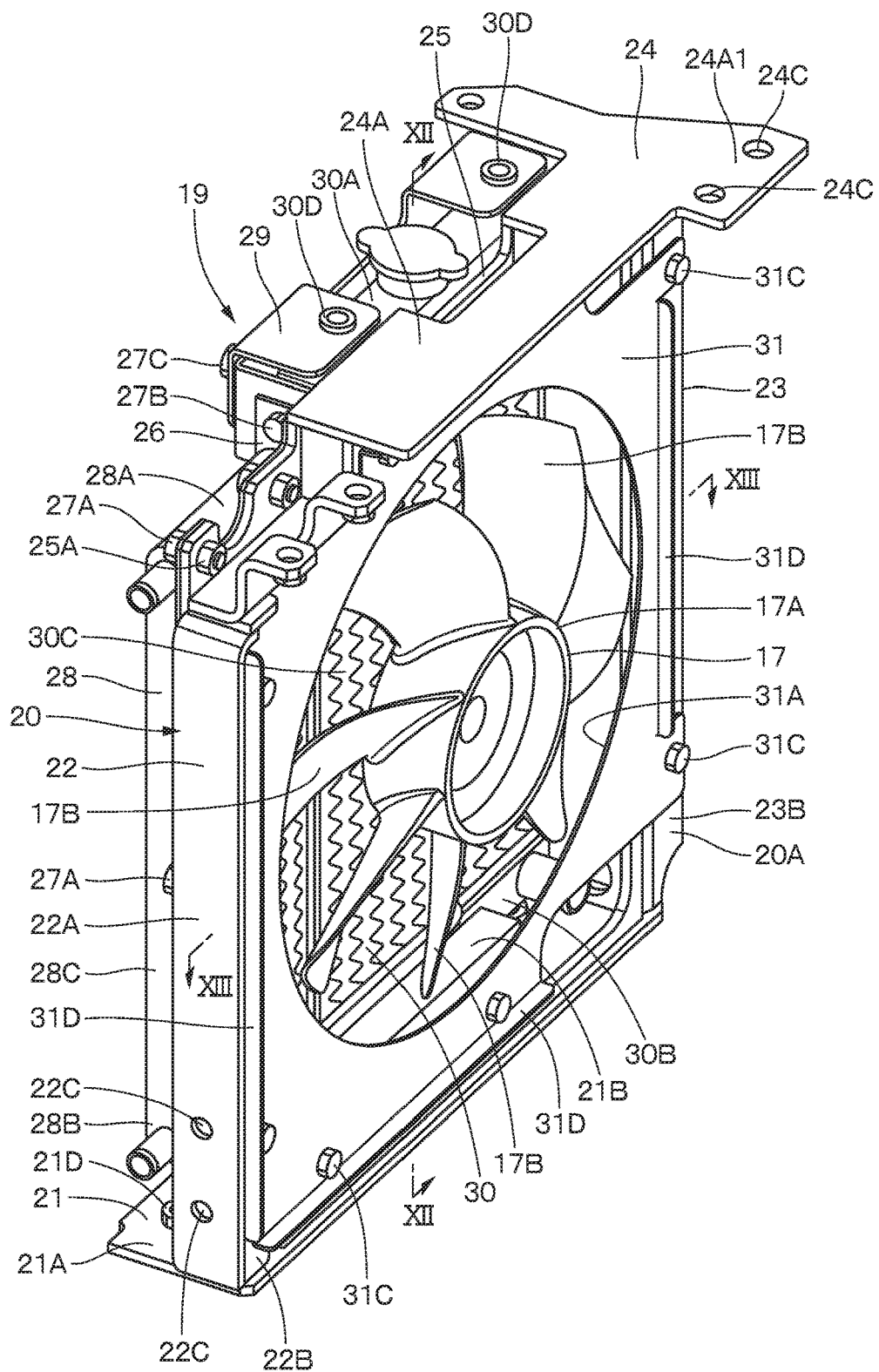
FIG. 11 is a perspective view of the heat exchanging device shown in FIG. 10 with a cooling fan seen from the engine side.
Figure 12:
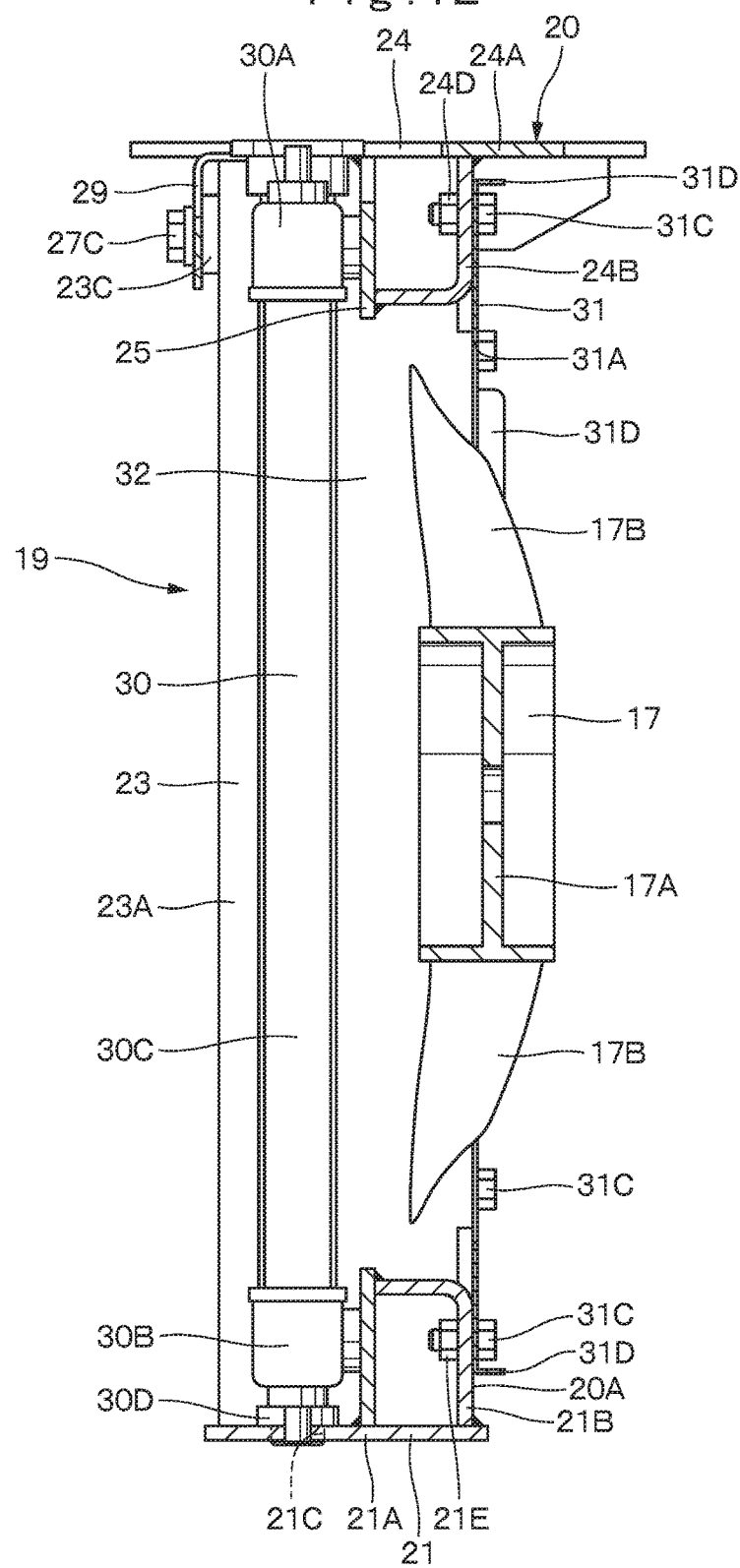
FIG. 12 is a sectional view of the heat exchanging device and a cooling fan seen from an arrow XII-XII direction in FIG. 11.

The cooling fan 17 is arranged on the right side which is one side of the engine 16 in the left and right direction, and the cooling fan 17 is mounted on the output shaft (not shown) of the engine 16. This cooling fan 17 is constituted as an axial flow suction fan for suctioning external air as cooling air and supplying it to the heat exchanging device 19 which will be described later by being rotated/driven together with the output shaft. Moreover, as shown in FIGS. 11 and 12, the cooling fan 17 is constituted by a cylindrical hub member 17A mounted on the output shaft of the engine 16 and a plurality of blades 17B extending radially from the periphery of the hub member 17A. Each of the blades 17B is formed with each tip end having an arc shape so as to draw a circle by the tip ends.

Figure 13:
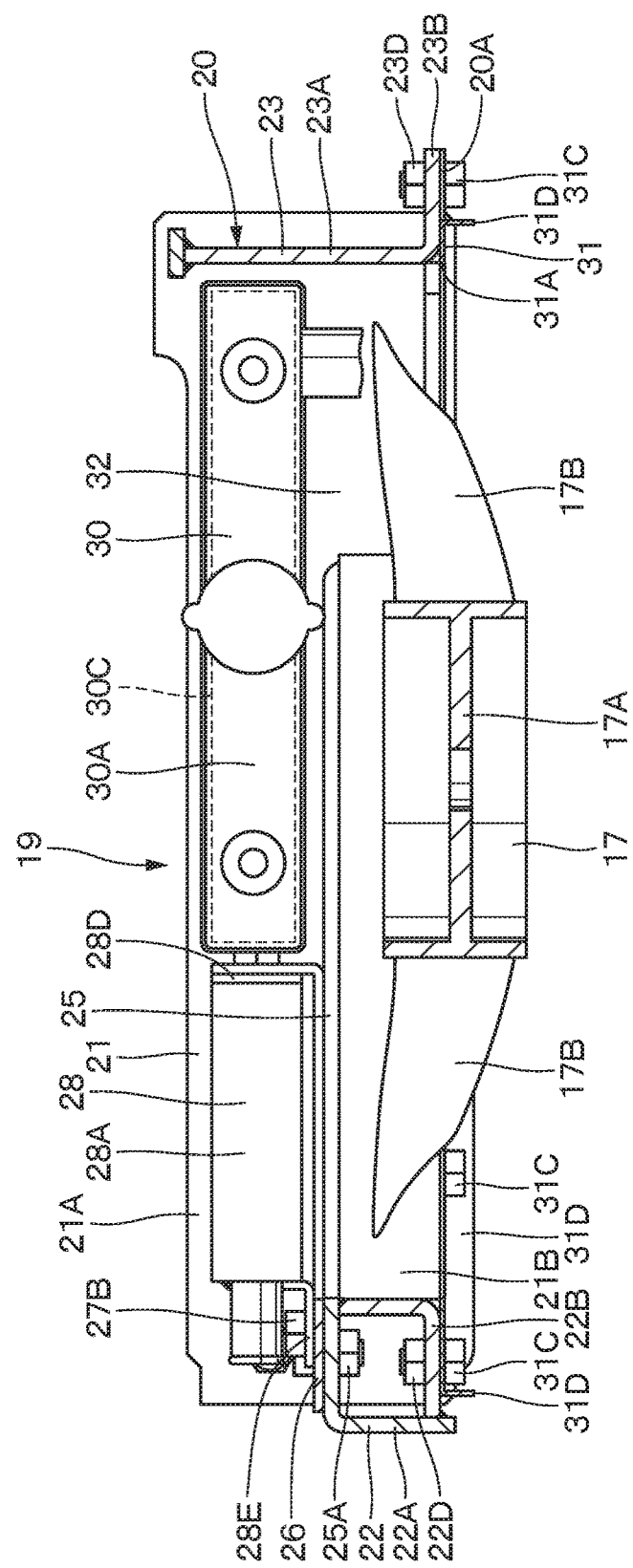
FIG. 13 is a sectional view of the heat exchanging device and the cooling fan seen from an arrow XIII-XIII direction in FIG. 11.

Here, the cooling fan 17 partially enters into the frame member 20 of the heat exchanging device 19 which will be described later. Specifically, each of the blades 17B of the cooling fan 17 is disposed in a state entering into the frame member 20 from an end surface 20A on the engine 16 side (hereinafter referred to as the engine side end surface 20A) with respect to the frame member 20. In this case, as shown in FIGS. 12 and 13, an entering dimension of the cooling fan 17 is set to a dimension that approximately a half of each of the blades 17B in an axial direction dimension enters into the frame member 20 from the engine side end surface 20A of the frame member 20. Therefore, the cooling fan 17 can form a sufficient gap from an oil cooler 28 and a radiator 30 which will be described later. As a result, the cooling fan 17 can supply the cooling air to the entirety of the oil cooler 28 and the radiator 30 and can also prevent contact with the oil cooler 28 and the radiator 30.

The hydraulic pump 18 is provided on the left side of the engine 16 which is the other side in the left and right direction. This hydraulic pump 18 is for supplying the hydraulic oil to the hydraulic actuator provided on the lower traveling structure 2, the working mechanism. 4 and the like by being driven by the engine 16.

In the small-sized hydraulic excavator 1, since an installation space on the revolving frame 5 is small, in order to effectively utilize the limited space, an operator's seat 39 which will be described later and the like are arranged on an upper side of the engine 16 and the hydraulic pump 18. In order to make this constitution possible, the support member 33 for supporting the operator's seat 39 and the like is provided on an upper side position of the engine 16 on a rear side of the revolving frame 5.

Subsequently, the heat exchanging device 19 according to this embodiment for cooling the hydraulic oil for operating various hydraulic actuators and engine coolant for cooling the engine 16 will be described. The frame member 20 constituting this heat exchanging device 19 is used as a right side leg part of the support member 33 in the left and right direction.

The heat exchanging device 19 is provided on the revolving frame 5 by being located on the right side which is one side of the engine 16 in the left and right direction. As shown in FIGS. 10 to 17, this heat exchanging device 19 is constituted by including the frame member 20, the oil cooler 28, the radiator 30, and the shroud 31 which will be described later.

Figure 14:
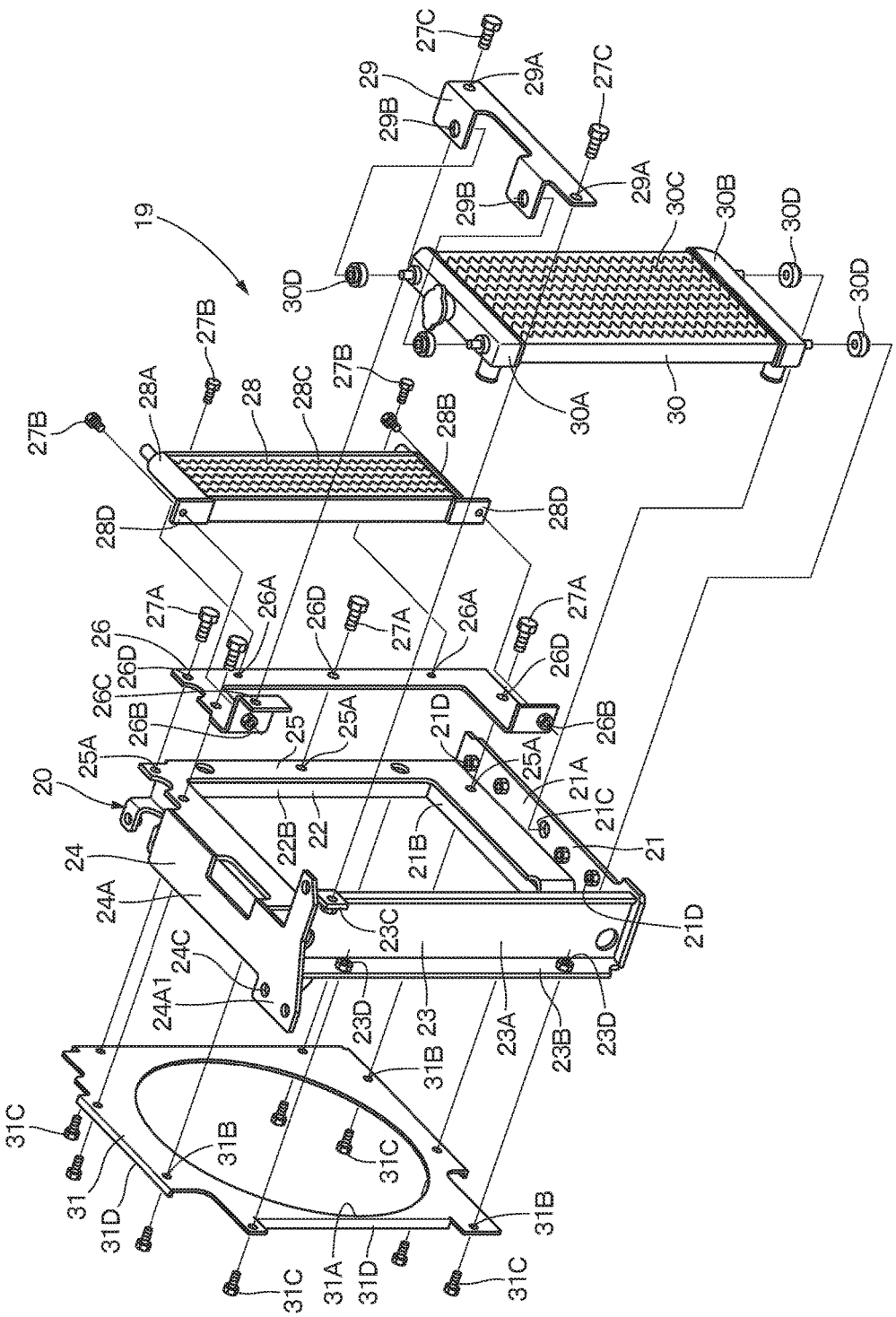
FIG. 14 is an exploded perspective view of the heat exchanging device in an exploded state.
Figure 15:
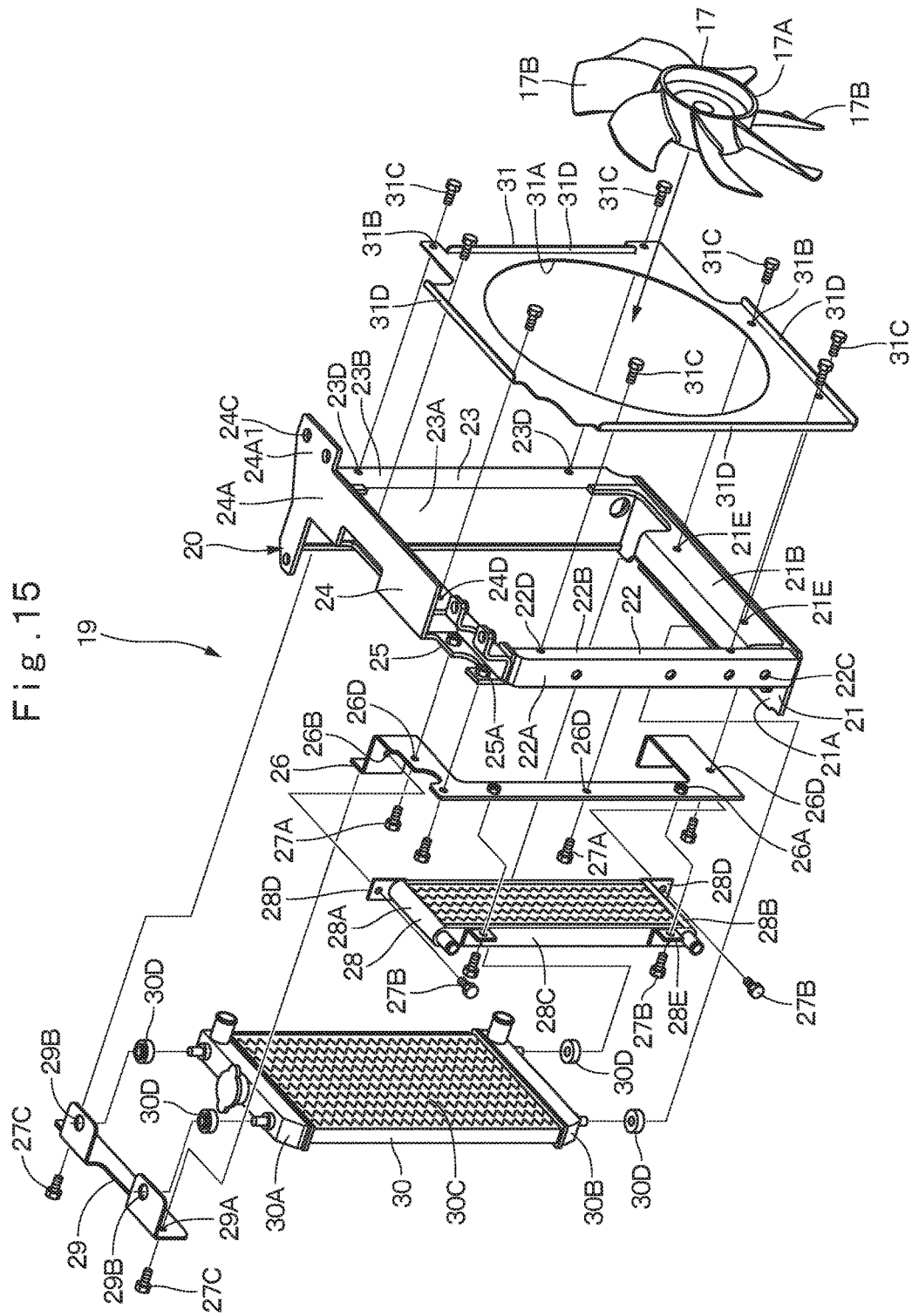
FIG. 15 is an exploded perspective view showing the heat exchanging device and the cooling fan exploded from an opposite side to FIG. 14.

The frame member 20 is for forming an outer frame of the heat exchanging device 19 and this frame member 20 is formed as a frame shaped body for supporting the oil cooler 28 and the radiator 30. That is, as shown in FIGS. 14 and 15, the frame member 20 is assembled by using a lower frame 21 located on a lower side, extending in the front and rear direction and mounted on the heat exchanging device mounting base 13 of the revolving frame 5, a pair of front side frame 22 and a rear side frame 23 extending to an upper side from both ends of the lower frame 21 in a length direction (front and rear direction), and an upper frame 24 extending at an upper position of each of the side frames 22 and 23 in the front and rear direction. In this case, the frame member 20 is assembled having a square frame shape as the whole.

In the square frame shaped frame member 20, the cooling air by the cooling fan 17 is made to flow. In this case, in the frame member 20, the cooling fan 17 and the shroud 31 are arranged by being located on the engine side end surface 20A which is on the engine 16 side (downstream side) in a flow direction of the cooling air.

On the other hand, in the frame member 20, a mounting surface plate 25 having a substantially C-shape is provided on an outer side located on an upstream side of the cooling air, that is, on the right side which is an opposite side to engine 16. As shown in FIG. 14, the oil cooler 28 (oil cooler bracket 26) and the radiator 30 (radiator bracket 29) which will be described later are mounted on this mounting surface plate 25. Moreover, a plurality of, for example, four, female screw holes 25A are provided in the mounting surface plate 25 at intervals in the vertical direction or in the left and right direction.

Here, the frame member 20 is formed having a square frame shape by appropriately fixing each of the frames 21 to 24 and the mounting surface plate 25 formed by applying various kinds of machining to a steel plate by using welding means. Therefore, the frame member 20 has high strength that can support the operator's seat 39, the canopy 42 and the like or specifically, strength equal to each of the leg parts 35 and 36 of the support member 33.

The lower frame 21 of the frame member 20 is constituted by a lower plate 21A made of a strip-shaped flat plate and a support plate 21B having an L-shaped section provided by extending on the lower plate 21A in the length direction (front and rear direction) and supporting the mounting surface plate 25. Moreover, two radiator mounting holes 21C (only one of them is shown in FIG. 14) located on an outer side (opposite side to the engine 16) from the mounting surface plate 25 which is an outer side end surface and closer to the rear side in the length direction (front and rear direction) and four female screw holes 21D made of weld nuts corresponding to each of the bolt insertion holes 13A provided in the heat exchanging device mounting base 13 of the revolving frame 5 are provided in the lower plate 21A at an interval in the front and rear direction.

Moreover, in the support plate 21B of the lower frame 21, its vertical plate portion constitutes a part of the engine side end surface 20A of the frame member 20. As shown in FIG. 15, for example, two, female screw holes 21E for mounting the shroud 31 are provided in the support plate 21B of this lower frame 21 at an interval in the front and rear direction.

The front side frame 22 of the frame member 20 is constituted by a rising plate 22A extending in the vertical direction and a support plate 22B having an L-shaped section mounted by extending on a rear surface of the rising plate 22A in the length direction (vertical direction) and supporting the mounting surface plate 25. In the rising plate 22A, two female screw holes 22C are provided at positions corresponding to the bolt insertion holes 10A provided in the partition plate 10 of the revolving frame 5 closer to a lower side in the length direction (vertical direction).

Moreover, the support plate 22B of the front side frame 22 constitutes a part of the engine side end surface 20A of the frame member 20. As shown in FIG. 15, for example, two female screw holes 22D for mounting the shroud 31 are provided in the support plate 22B of the front side frame 22 at an interval in the vertical direction.

The rear side frame 23 of the frame member 20 is constituted by the rising plate 23A extending in the vertical direction as to face the front side frame 22 in the front and rear direction and a bent plate 23B formed by bending an end edge of the rising plate 23A on the engine 16 side and constituting a part of the engine side end surface 20A of the frame member 20. In the rising plate 23A, at an upper position, a screw seat 23C for mounting the radiator bracket 29 which will be described later is provided on an opposite side to the bent plate 23B. Moreover, for example, two female screw holes 23D for mounting the shroud 31 are provided in the bent plate 23B at an interval in the vertical direction.

Figure 10:
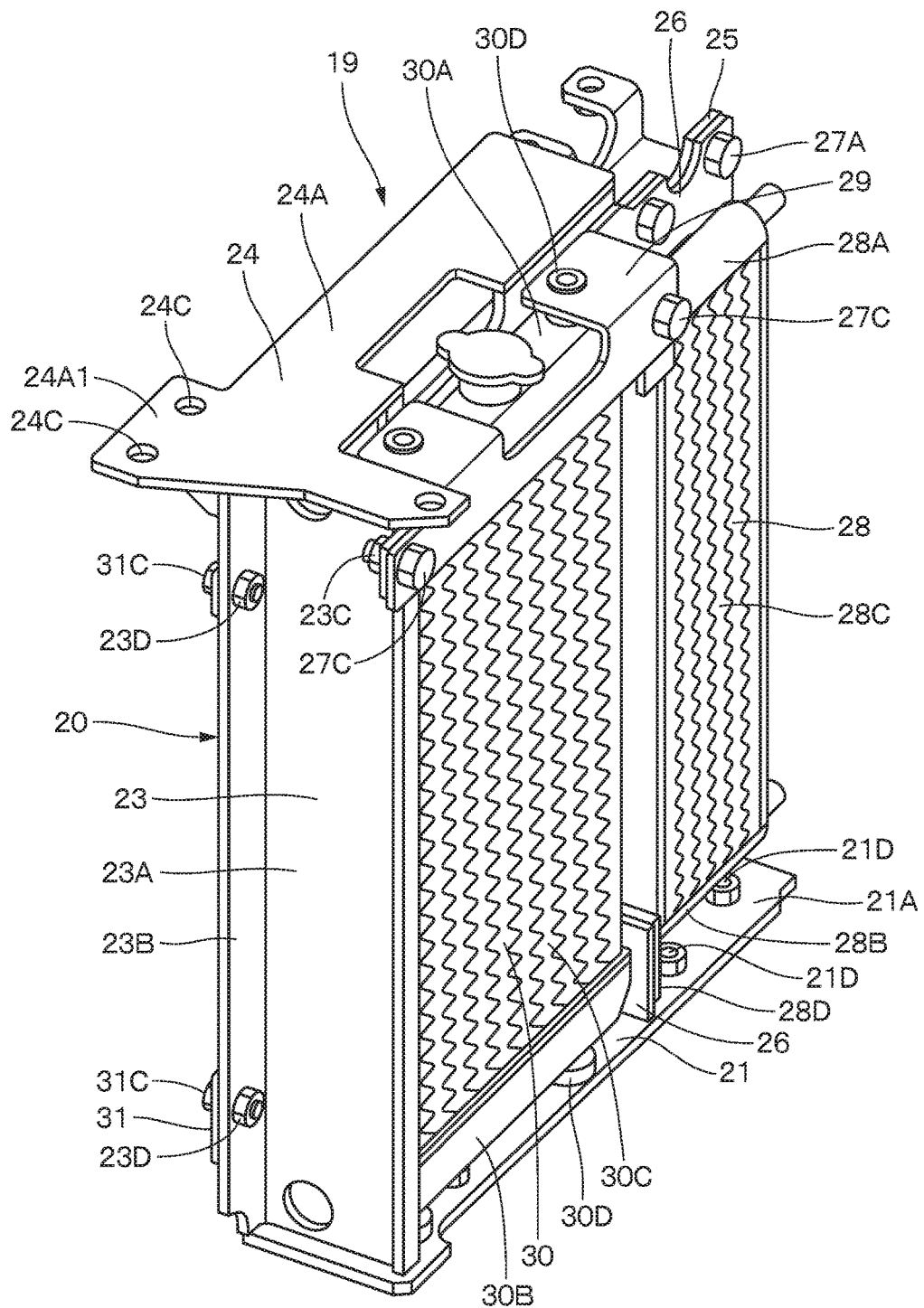
FIG. 10 is a perspective view of the heat exchanging device in FIG. 7 in an enlarged manner.

The upper frame 24 of the frame member 20 is constituted by a flat plate shaped upper plate 24A and a support plate 24B (see, FIG. 12) having an L-shaped section provided by extending in below the upper plate 24A in the length direction (front and rear direction) and supporting the mounting surface plate 25. As shown in FIGS. 10 and 11, a mounting plate portion 24A1 is provided by extending to the rear side more than the rear side frame 23 on the upper plate 24A. In this mounting plate portion 24A1, a plurality of, for example, two, bolt insertion holes 24C are formed by being located closer to the left side which is the engine 16 side at an interval in the front and rear direction. The support member fixing bolt 37 for fixing a free end 34F of the housing support base 34 of the support member 33 which will be described later is inserted into the two bolt insertion holes 24C.

Moreover, as shown in FIG. 12, in the support plate 24B of the upper frame 24, vertical plate portion of the support plate 24B constitutes a part of the engine side end surface 20A of the frame member 20. For example, two female screw holes 24D for mounting the shroud 31 are provided in this support plate 24B at an interval in the front and rear direction.

Here, the frame member 20 has the square frame shaped engine side end surface 20A located on the engine 16 side. This engine side end surface 20A is formed by using the support plate 21B of the lower frame 21, the support plate 22B of the front side frame 22, the bent plate 23B of the rear side frame 23, and the support plate 24B of the upper frame 24. In this case, the engine side end surface 20A is formed as a square frame having the same planar shape as the whole. The shroud 31 is detachably attached on this engine side end surface 20A. On the other hand, on the mounting surface plate 25 of the frame member 20 which is the end surface on the opposite side to the engine 16, the oil cooler 28 and the radiator 30 are mounted.

The oil cooler bracket 26 is mounted on the mounting surface plate 25 of the frame member 20, and the oil cooler bracket 26 is formed as a C-shaped or U-shaped plate body opened on the rear side. Two female screw holes 26A located in an intermediate portion in the vertical direction are provided in the oil cooler bracket 26. On the other hand, female screw holes 26B are provided in upper and lower end portions of the oil cooler bracket 26 so as to be screwed from the front side. Female screw holes 26C are provided in the upper end portion of the oil cooler bracket 26 so as to be screwed from the right side in the left and right direction. Moreover, bolt insertion holes 26D are respectively provided in the intermediate portion and the lower portion of the oil cooler bracket 26 in the vertical direction. Here, the oil cooler bracket 26 can be fixed along the mounting surface plate 25 by screwing an oil cooler bracket fixing bolt 27A inserted through each of the bolt insertion holes 26D with the female screw hole 25A of the mounting surface plate 25.

The oil cooler 28 is provided on the frame member 20 through the oil cooler bracket 26. This oil cooler 28 is for cooling the hydraulic oil to be returned from the hydraulic actuators provided on the lower traveling structure 2 and the working mechanism 4 to the hydraulic oil tank (not shown). The oil cooler 28 is formed of an upper tank 28A, a lower tank 28B, and a heat radiation portion 28C, and mounting plates 28D in which the oil cooler fixing bolts 27B are inserted into the front and rear direction are provided at upper and lower positions of each of the tanks 28A and 28B. Moreover, two mounting plates 28E are provided in the oil cooler 28 at front side positions of the heat radiation portion 28C (see, FIG. 15).

The oil cooler 28 is mounted on the mounting surface plate 25 through the oil cooler bracket 26. That is, the oil cooler fixing bolt 27B inserted into each of the mounting plates 28D is screwed with the female screw hole 26B of the oil cooler bracket 26, and the oil cooler fixing bolt 27B inserted into each of the mounting plates 28E is screwed with the female screw hole 26A of the oil cooler bracket 26 so that the oil cooler 28 can be mounted on the mounting surface plate 25.

The radiator bracket 29 is mounted on the upper right side (the mounting surface plate 25 side) of the frame member 20, and the radiator bracket 29 constitutes an upper side fixing member for fixing an upper part of the radiator 30 to the frame member 20. In the radiator bracket 29, a bolt insertion hole 29A located on an end portion in the front and rear direction and penetrating in the left and right direction is formed. On the other hand, a radiator mounting hole 29B is provided in the radiator bracket 29 at a position faced with each of the radiator mounting hole 21C of the lower frame 21 of the frame member 20 interposing the radiator 30. The radiator bracket 29 is fixed to the upper part of the frame member 20. That is, the radiator bracket fixing bolt 27C inserted into the bolt insertion hole 29A on the front side is screwed with the female screw hole 26C of the oil cooler bracket 26, and the radiator bracket fixing bolt 27C inserted into the bolt insertion hole 29A on the rear side is screwed with the screw seat 23C of the rear side frame 23 so that the radiator bracket 29 can be mounted on the frame member 20.

The radiator 30 is provided on the frame member 20 by being located on the rear side of the oil cooler 28, and the radiator 30 is for cooling the engine coolant whose temperature has risen by cooling the engine 16. The radiator 30 is formed of an upper tank 30A, a lower tank 30B, and a heat radiation portion 30C and each of the tanks 30A and 30B is connected to a water jacket (not shown) of the engine 16. The radiator 30 has the upper tank 30A supported by the radiator mounting hole 29B of the radiator bracket 29 through an anti-vibration member 30D and the lower tank 30B supported by the radiator mounting hole 21C of the lower frame 21 through the anti-vibration member 30D.

Here, the oil cooler 28 is mounted on the mounting surface plate 25 of the frame member 20 through the oil cooler bracket 26. The radiator 30 is mounted on the mounting surface plate 25 of the frame member 20 through the radiator bracket 29 and the oil cooler bracket 26. As a result, the oil cooler 28 and the radiator 30 are mounted on the mounting surface plate 25 constituting the end surface on the opposite side to the engine 16 interposing the cooling fan 17. In this case, the oil cooler 28 and the radiator 30 are mounted in parallel so as to be juxtaposed in the front and rear direction in the flow direction of the cooling air (left and right direction).

It should be noted that the oil cooler 28 and the radiator 30 are arranged at positions where a desired interval dimension can be ensured from the cooling fan 17. Therefore, if this interval dimension can be ensured, the oil cooler 28 and the radiator 30 can be arranged in a state partially entering in the frame member 20 beyond the mounting surface plate 25.

On the other hand, a disposition position of the cooling fan 17 with respect to the heat exchanging device 19 is at a position where each of the blades 17B enters into the frame member 20 from the mounting surface plate 25 of the frame member 20 only by approximately a half of each of the blades 17B in the axial direction dimension.

Subsequently, a constitution of the shroud 31 which is a feature portion of this embodiment provided on the heat exchanging device 19 will be described in detail.

The shroud 31 forms a part of the heat exchanging device 19, and the shroud 31 is provided so as to surround an outer periphery of each of the blades 17B of the cooling fan 17 with respect to the engine side end surface 20A of the frame member 20. As a result, the shroud 31 covers a gap between the cooling fan 17 and the frame member 20 (engine side end surface 20A) so that a fan accommodating chamber 32 (see, FIGS. 12 and 13) can be formed among the frame member 20, the oil cooler 28, and the radiator 30. In this fan accommodating chamber 32, the cooing air by the cooling fan 17 can be made to flow efficiently.

Figure 16:
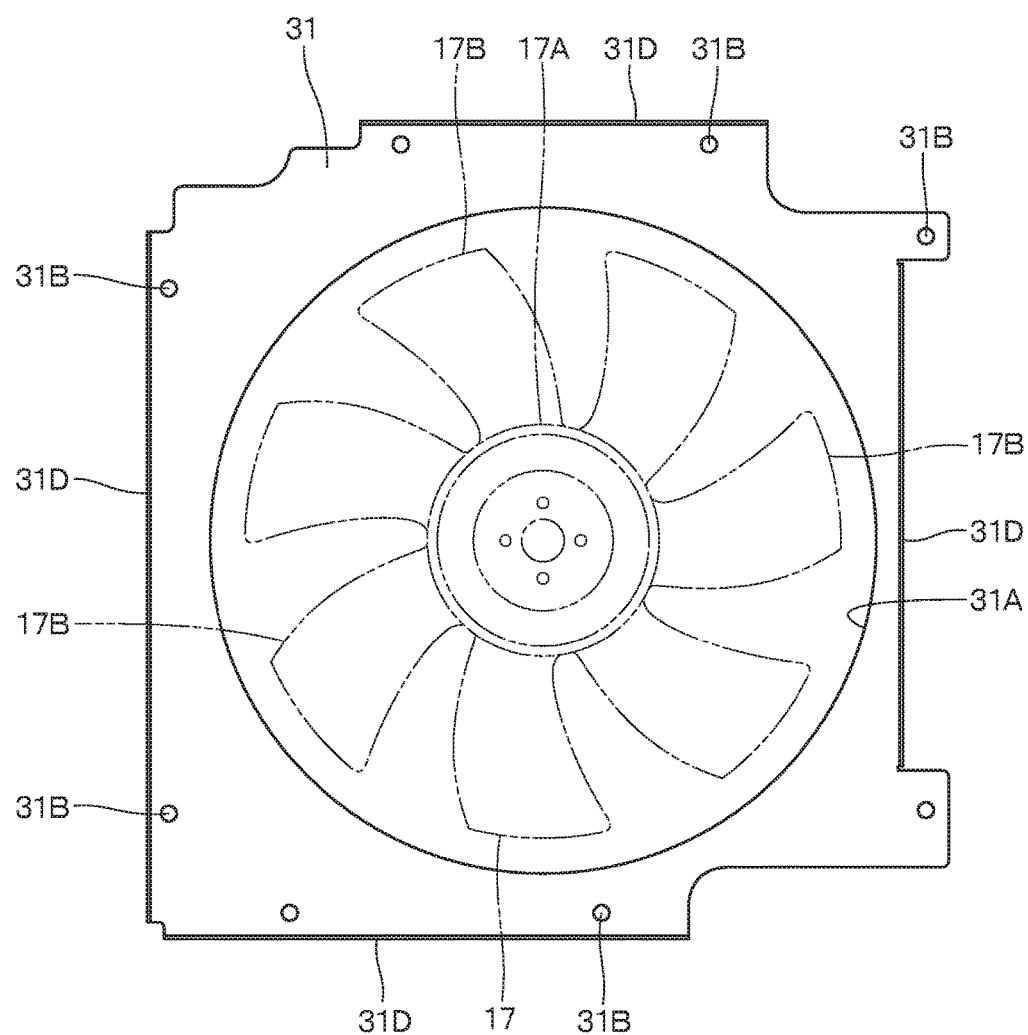
FIG. 16 is a front view showing a shroud in an enlarged manner.
Figure 17:
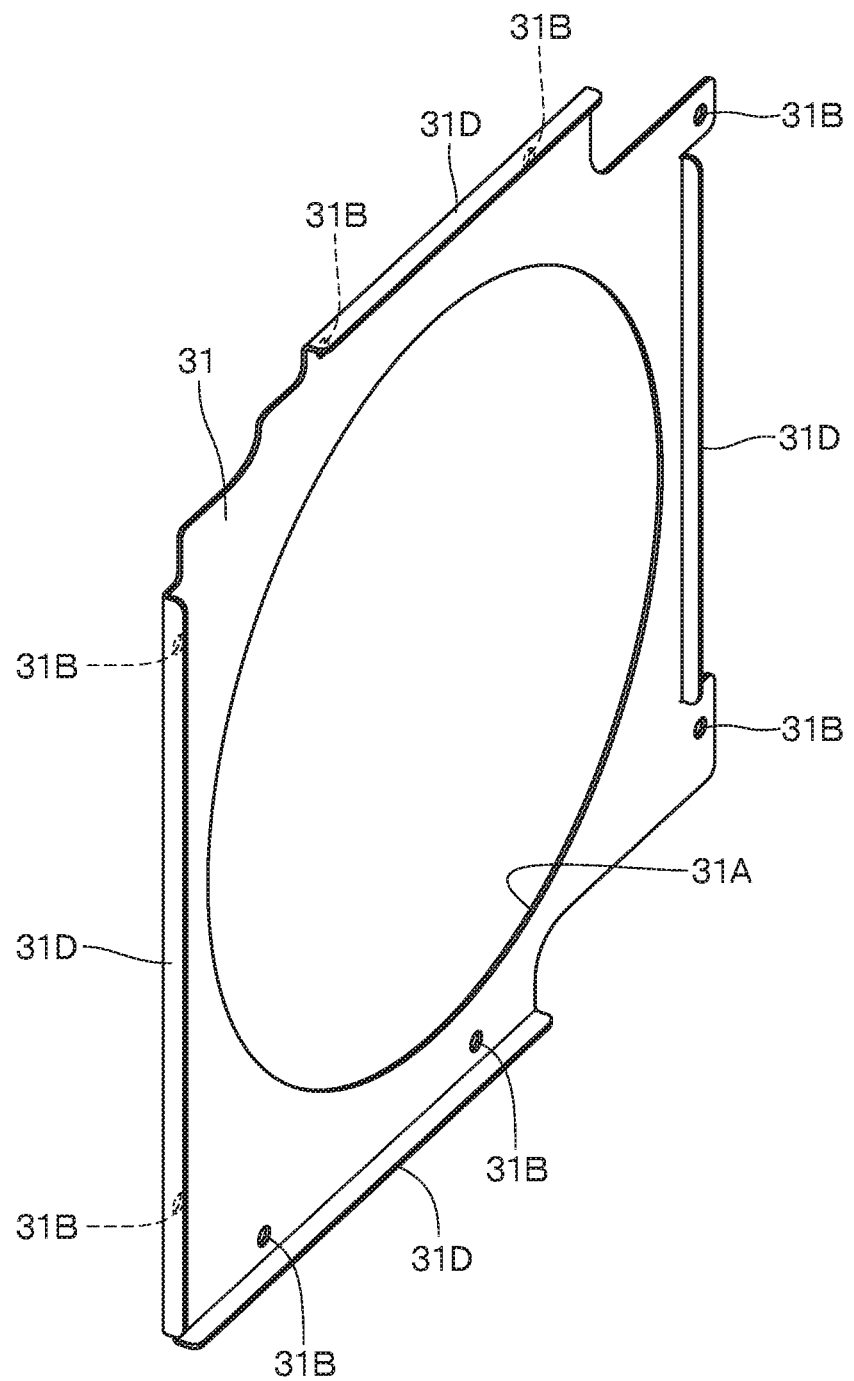
FIG. 17 is a perspective view showing the shroud in an enlarged manner.

As shown in FIGS. 16 and 17, the shroud 31 is made of a substantially rectangular thin plate material, and a circular opening 31A for surrounding the cooling fan 17 is formed at its center position. Bolt insertion holes 31B are provided in a peripheral portion of the shroud 31 at positions corresponding the female screw holes 21E, 22D, 23D, and 24D, respectively, provided on the engine side end surface 20A (each of the frames 21, 22, 23, and 24) of the frame member 20. Into these bolt insertion holes 31B, the shroud fixing bolts 31C are inserted, respectively. Moreover, on four side portions of the shroud 31, bent portions 31D are formed by bending end edges, and strength of the shroud 31 made of a thin plate material can be improved by these bent portions 31D.

That is, it is only necessary that the shroud 31 has a shape that can cover the gap between the cooling fan 17 and the frame member 20 and can be formed as a simple flat plate shape obtained only by applying drilling, bending or the like to a steel plate with a thin plate thickness, for example. Moreover, the shroud 31 can be detachably fixed to the frame member 20 by screwing the shroud fixing bolt 31C inserted into each of the bolt insertion holes 31B with each of the female screw holes 21E, 22D, 23D, and 24D of the engine side end surface 20A.

Figure 7:
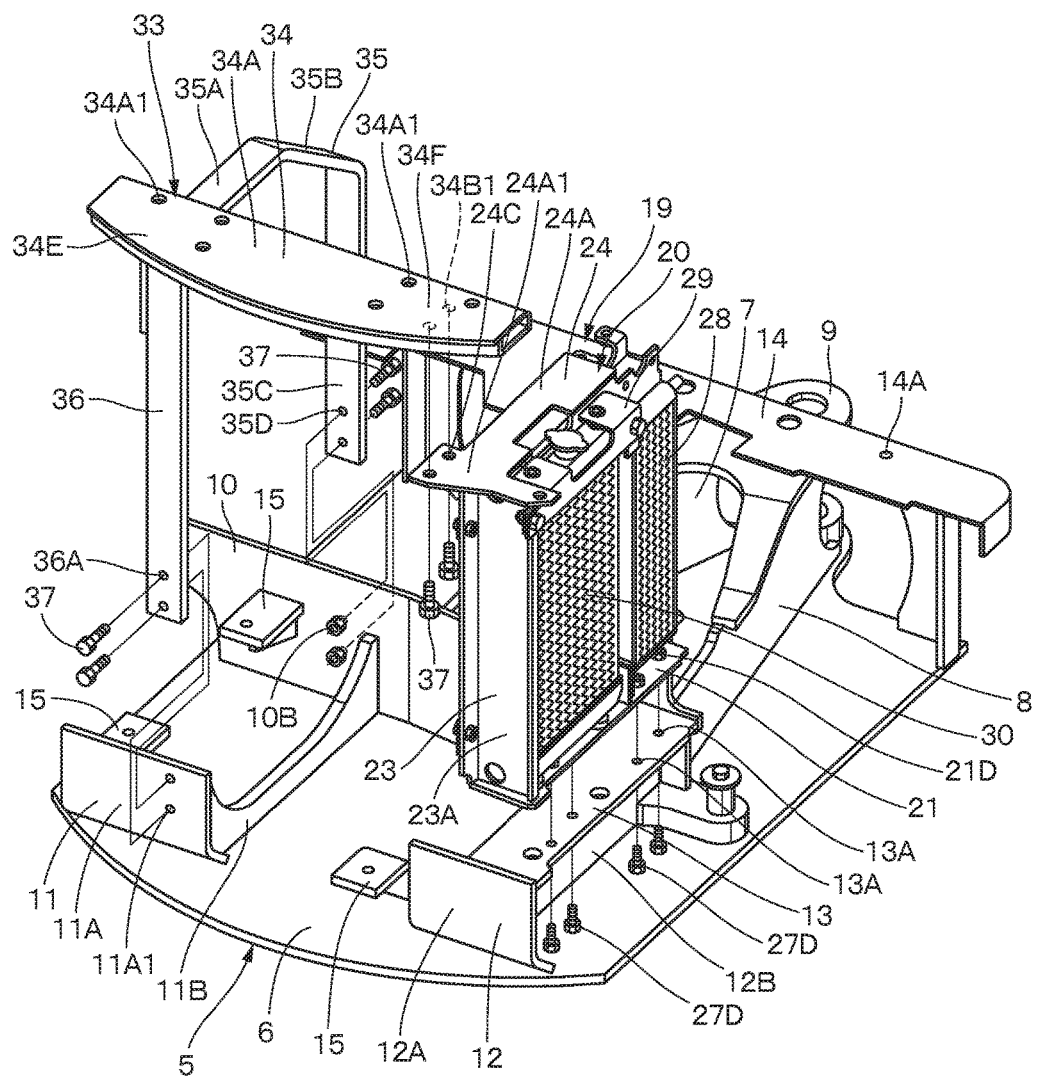
FIG. 7 is an exploded perspective view of a state in which the revolving frame, the heat exchanging device and the supporting member are separated from each other seen from the right rear side.
Figure 8:
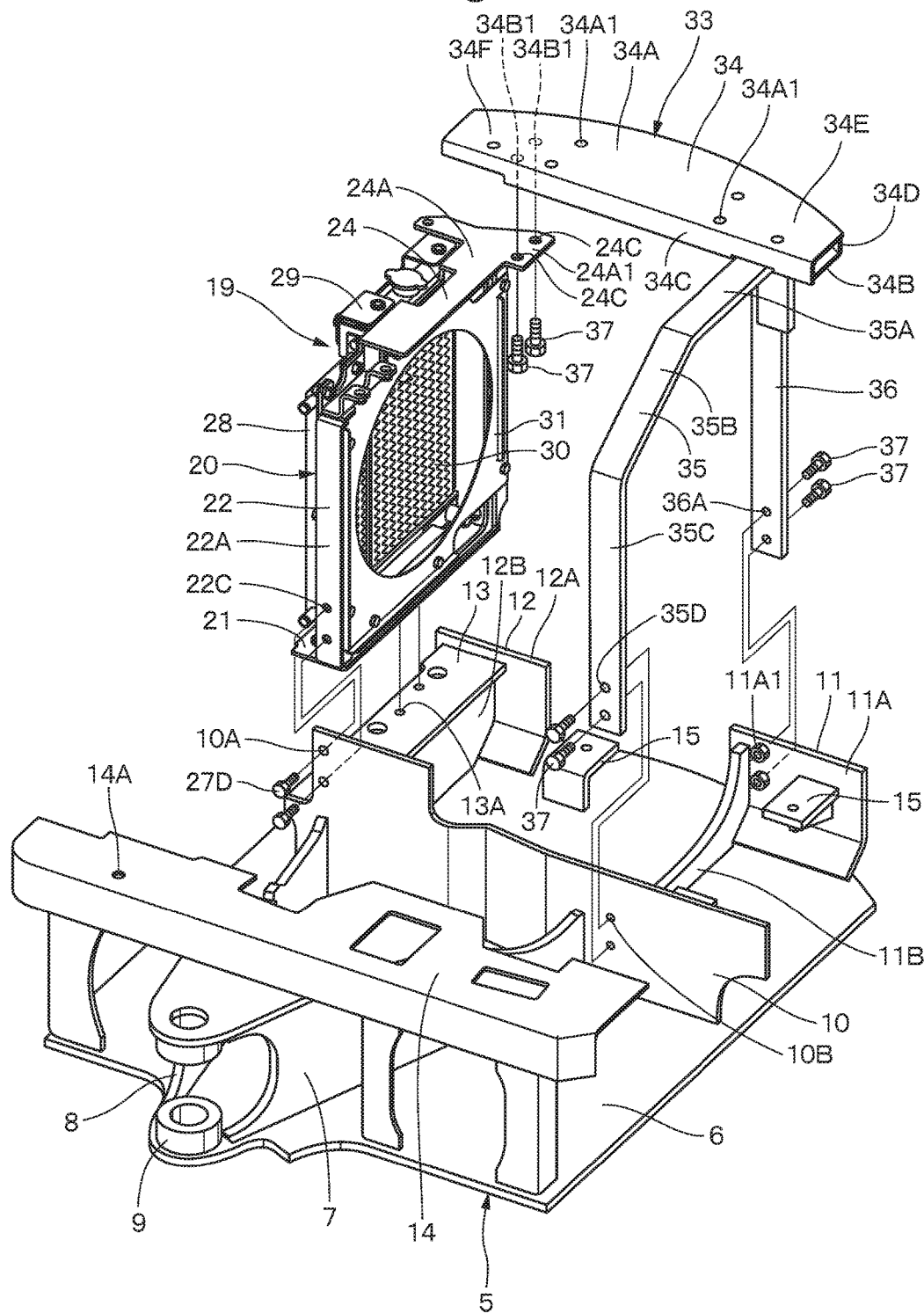
FIG. 8 is an exploded perspective view of a state in which the revolving frame, the heat exchanging device and the supporting member are separated from each other seen from the left front side.

Regarding the heat exchanging device 19 constituted as above, the lower frame 21 of the frame member 20 is placed on the heat exchanging device mounting base 13 of the revolving frame 5 and as shown in FIG. 7, the frame member fixing bolt 27D inserted into the bolt insertion hole 13A from the lower side of the lower frame 21 in this state is screwed with the female screw hole 21D of the lower frame 21. Moreover, as shown in FIG. 8, the frame member fixing bolt 27D inserted into the bolt insertion hole 10A of the partition plate 10 is screwed with the female screw hole 22C of the front side frame 22. As a result, the heat exchanging device 19 (frame member 20) can be firmly fixed to the right rear vertical plate 12 of the revolving frame 5.

Subsequently, constitution of the support member 33 provided for supporting the operator's seat 39, the canopy 42 and the like on the upper side of the engine 16 will be described.

The support member 33 is provided on the revolving frame 5 in a state across the engine 16 from the upper side. This support member 33 is for supporting the operator's seat 39 and the canopy 42. That is, the support member 33 is for arranging the operator's seat 39, the canopy 42 and the like, which will be described later, over the engine 16 in order to effectively use a limited space on the revolving frame 5. Here, the support member 33 is constituted by the housing support base 34, the left front leg part 35, and the left rear leg part 36 which will be described later.

The housing support base 34 is provided by extending in the left and right direction over the engine 16. As shown in FIGS. 3 and 4, a rear mounting plate 42A of the canopy 42 which will be described later is mounted on this housing support base 34. The housing support base 34 forms a box body which is lengthy in the left and right direction and flat in the vertical direction in order to obtain strength for supporting the rear side of the canopy 42. Specifically, as shown in FIGS. 6 and 8, the housing support base 34 is formed of an upper plate 34A, a lower plate 34B, a front plate 34C, and a rear plate 34D. In the upper plate 34A of the housing support base 34, a plurality of female screw holes 34A1, for example, six in total, by three each on right and left positions, are provided for fixing the rear mounting plate 42A of the canopy 42.

On the lower plate 34B of the housing support base 34, the left front leg part 35 and the left rear leg part 36 which will be described later are mounted by being located on the left side which is the other side in the left and right direction. As a result, the left side portion of the housing support base 34 becomes a fixed end 34E fixed to each of the leg parts 35 and 36, while the right side portion which is one side of the housing support base 34 becomes the free end 34F on which no leg part is provided.

Here, in the lower plate 34B of the housing support base 34, a plurality of, for example, two, female screw holes 34B1 (shown by a dotted line in FIGS. 7 and 8) are provided by being located on the free end 34F side. These two female screw holes 34B1 are arranged at an interval in the front and rear direction so as to correspond to the bolt insertion holes 24C provided in the upper frame 24 of the frame member 20 in the heat exchanging device 19.

The left front leg part 35 is provided by being located on the fixed end 34E side which is the other side of the housing support base 34 in the left and right direction. This left front leg part 35 has its upper end mounted on the lower plate 34B of the housing support base 34 and the lower end mounted on the partition plate 10 of the revolving frame 5. That is, the left front leg part 35 is constituted by a lateral leg 35A extending from the lower plate 34B of the housing support base 34 to the front side, an inclined leg 35B extending diagonally to the lower side from the front end of the lateral leg 35A, and a vertical leg 35C extending downward from the tip end of the inclined leg 35B. A plurality of, for example, two, bolt insertion holes 35D are provided in a lower side of the vertical leg 35C. These two bolt insertion holes 35D are arranged at an interval in the vertical direction so as to correspond to the female screw holes 10B provided in the partition plate 10.

The left rear leg part 36 is provided on the fixed end 34E side of the housing support base 34 by being located on the rear side of the left front leg part 35. This left rear leg part 36 is provided by extending in the vertical direction and has its upper end mounted on the lower plate 34B of the housing support base 34 and the lower end mounted on the left rear end plate 11A of the revolving frame 5. A plurality of, for example, two, bolt insertion holes 36A are provided in a lower side of the left rear leg part 36. These two bolt insertion holes 36A are arranged at an interval in the vertical direction so as to correspond to the female screw holes 11A1 provided in the left rear end plate 11A of the left rear vertical plate 11.

As shown in FIG. 6, the support member 33 constituted as above is arranged so that the left front leg part 35 and the left rear leg part 36 are placed across the engine 16 in the front and rear direction, and as shown in FIGS. 7 and 8, the support member fixing bolt 37 inserted into the bolt insertion hole 35D of the left front leg part 35 is screwed with the female screw hole 10B provided in the partition plate 10 of the revolving frame 5. On the other hand, in the left rear leg part 36, the support member fixing bolt 37 inserted into the bolt insertion hole 36A is screwed with the female screw hole 11A1 provided in the left rear end plate 11A of the revolving frame 5. In this state, the free end 34F side of the housing support base 34 is arranged on the frame member 20 of the heat exchanging device 19.

Then, the support member fixing bolt 37 inserted into the bolt insertion hole 24C provided in the mounting plate portion 24A1 of the upper frame 24 of the frame member 20 from the lower side is screwed with the female screw hole 34B1 provided in the lower plate 34B of the housing support base 34 so that the free end 34F side of the housing support base 34 can be fixed to the upper surface side of the frame member 20. In this case, the frame member 20 can support the housing support base 34 in a horizontal state by matching its height dimension with the height dimension of each of the leg parts 35 and 36.

As a result, as shown in FIGS. 4 and 6, the support member 33 can use the frame member 20 of the heat exchanging device 19 as the right side leg part for supporting the free end 34F of the housing support base 34. Thereby, the support member 33 can omit the right side leg part.

Figure 2:
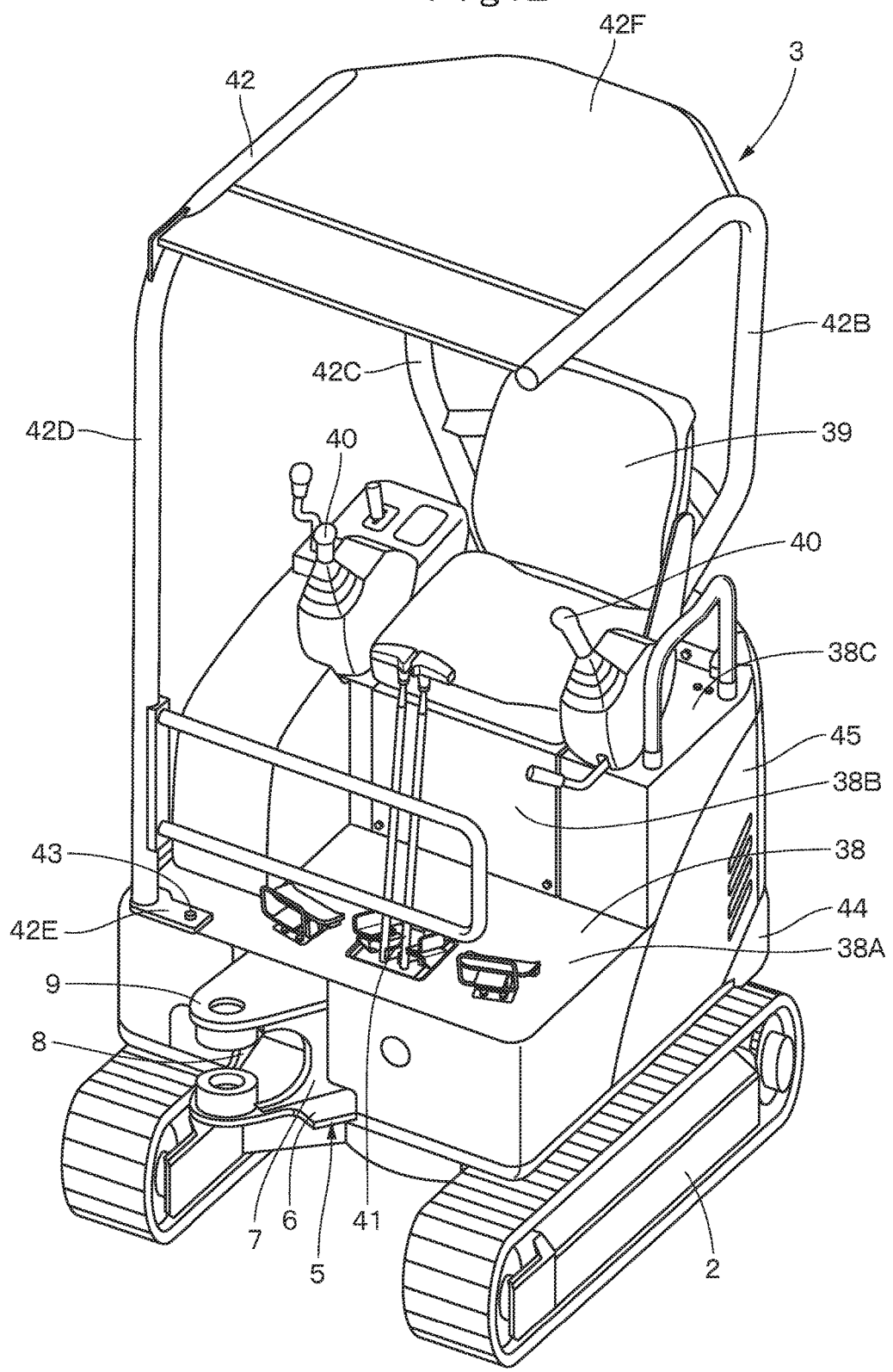
FIG. 2 is a perspective view of a hydraulic excavator which a working mechanism is omitted seen from a left front side.
Figure 5:
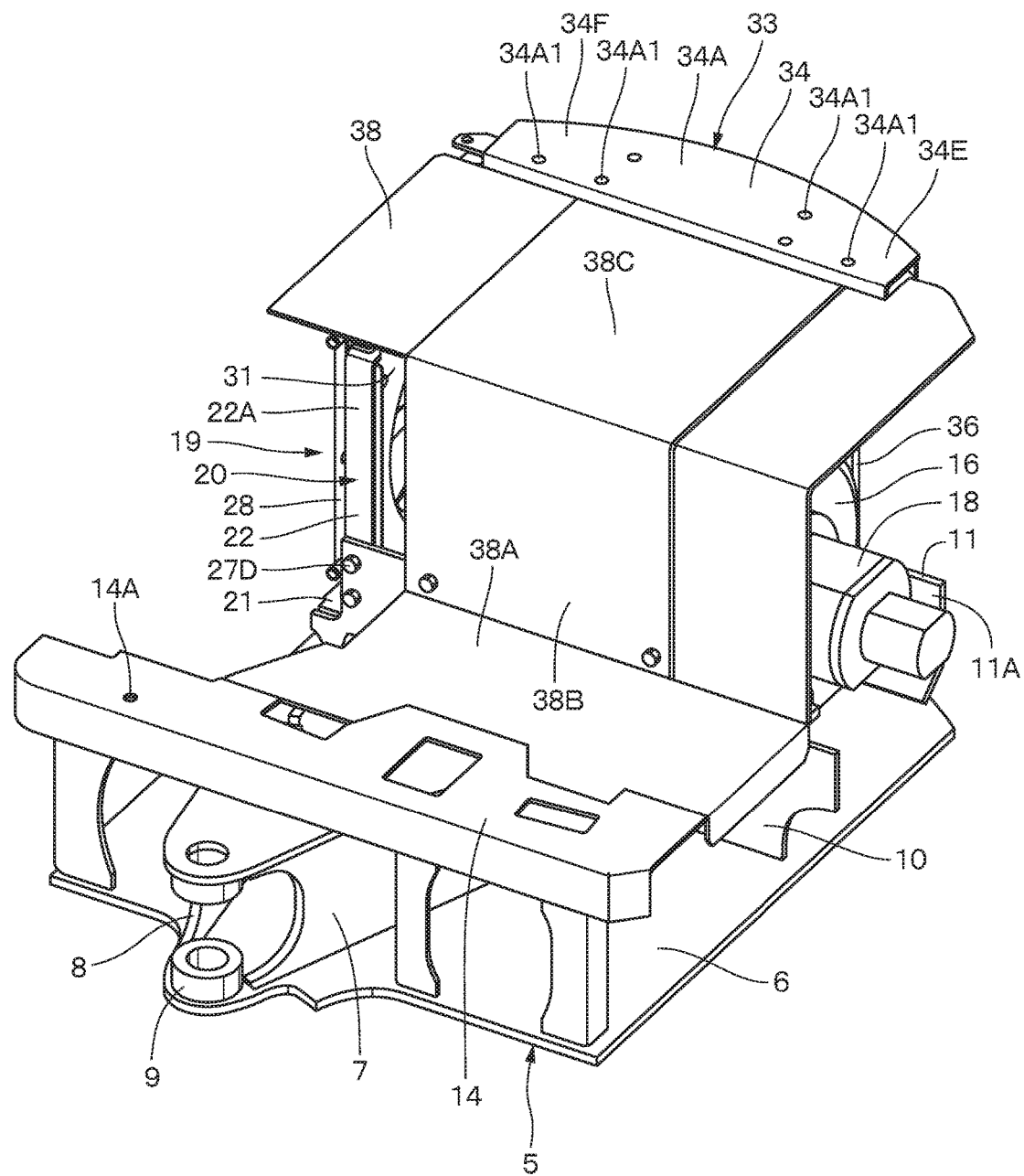
FIG. 5 is a perspective view of a state in which the engine, the heat exchanging device, the support member and a floor member are mounted on the revolving frame seen from the left front side.

As shown in FIGS. 2 and 5, the floor member 38 is provided on the revolving frame 5 from the upper side to the front side of the engine 16. This floor member 38 is formed having a step shape by a substantially flat footrest plate 38A extending to the rear side from the floor mounting member 14 of the revolving frame 5, a rising plate 38B rising from a rear part of the footrest plate 38A, and an operator's seat mounting plate 38C extending to the rear side from an upper part of the rising plate 38B. The operator's seat mounting plate 38C on the rear side is mounted on the frame member 20 of the heat exchanging device 19 and on the left front leg part 35 of the support member 33, for example.

The operator's seat 39 is provided on the operator's seat mounting plate 38C of the floor member 38, and the operator's seat 39 is on which the operator is seated. As shown in FIG. 2, on both right and left sides of the operator's seat 39, an operating lever 40 for operation is disposed, and on the front side of the operator's seat 39, an operating lever/pedal 41 for running is disposed.

The canopy 42 is provided on the upper revolving structure 3, and the canopy 42 constitutes a housing covering an upper part of the operator's seat 39. In this embodiment, a three-column type canopy is used as the canopy 42. As shown in FIGS. 3 and 4, the canopy 42 is constituted by including a rear mounting plate 42A faced with the housing support base 34 of the support member 33, a left rear column 42B located on a left rear side of the operator's seat 39 and extending upward from the upper surface of the rear mounting plate 42A, a right rear column 42C located on a right rear side of the operator's seat 39 and extending upward from the upper surface of the rear mounting plate 42A, a right front column 42D extending upward from a right side position of the floor mounting member 14 of the revolving frame 5, a front mounting plate 42E provided on a lower part of the right front column 42D and faced with the floor mounting member 14, and a roof portion 42F provided on an upper part of each of the columns 42B to 42D.

Six bolt insertion holes 42A1 corresponding to each of the female screw holes 34A1 provided in the upper plate 34A of the housing support base 34 are provided in the rear mounting plate 42A. On the other hand, a bolt insertion hole 42E1 corresponding to the female screw hole 14A of the floor mounting member 14 is provided in the front mounting plate 42E.

Here, in the canopy 42, the rear mounting plate 42A is placed on the housing support base 34 of the support member 33, and the front mounting plate 42E is placed on the floor mounting member 14 of the revolving frame 5. In this state, the canopy fixing bolt 43 inserted into each of the bolt insertion holes 42A1 of the rear mounting plate 42A is screwed with each of the female screw holes 34A1 of the upper plate 34A of the housing support base 34. As a result, the rear side of the canopy 42 can be mounted on the support member 33. On the other hand, by screwing the canopy fixing bolt 43 inserted into the bolt insertion hole 42E1 of the front mounting plate 42E with the female screw hole 14A of the floor mounting member 14, the right front side of the canopy 42 can be mounted on the revolving frame 5.

A counterweight 44 is mounted on a rear end portion of the revolving frame 5. This counterweight 44 is to take a weight balance with the working mechanism 4 and is formed as a heavy article having a substantially arc shape.

An exterior cover 45 is provided on the revolving frame 5 from the rear side to the side of the canopy 42. This exterior cover 45 is to cover the engine 16, the heat exchanging device 19 and the like mounted on the revolving frame 5.

The hydraulic excavator 1 according to this embodiment has the constitution described above, and then, an operation of this hydraulic excavator 1 will be described.

First, the operator gets onboard the upper revolving structure 3 and is seated on the operator's seat 39. In this state, by operating the operating lever/pedal 41 for running, the operator can drive the lower traveling structure 2 so as to advance or retreat the hydraulic excavator 1. On the other hand, the operator seated on the operator's seat 39 can operate the working mechanism 4 and the like so as to perform an excavating work of earth and sand by operating the operating lever 40 for operation.

Here, a work procedure when the heat exchanging device 19, the support member 33, and the canopy 42 are to be mounted on the revolving frame 5 constituting the upper revolving structure 3 will be described. The work procedure in this case exemplifies one of some work procedures, and mounting may be performed by using another work procedure.

As shown in FIG. 7, when the heat exchanging device 19 is to be mounted on the revolving frame 5, the lower frame 21 of the frame member 20 is placed on the heat exchanging device mounting base 13 of the revolving frame 5. In this state, the frame member fixing bolt 27D inserted into the bolt insertion hole 13A from the lower side of the lower frame 21 is screwed with the female screw hole 21D of the lower frame 21. Moreover, as shown in FIG. 8, the frame member fixing bolt 27D inserted into the bolt insertion hole 10A of the partition plate 10 is screwed with the female screw hole 22C of the front side frame 22. As a result, the heat exchanging device 19 can be mounted on the revolving frame 5.

Here, the arrangement relation of the cooling fan 17, the frame member 20, the oil cooler 28, the radiator 30, and the shroud 31 when the heat exchanging device 19 is mounted on the revolving frame 5 will be described. As shown in FIGS. 12 and 13, the cooling fan 17 provided on the engine 16 is disposed in the state in which each of the blades 17B enters into the frame member 20 from the engine side end surface 20A (shroud 31) of the frame member 20 by approximately a half thereof. On the other hand, the oil cooler 28 and the radiator 30 are mounted on the mounting surface plate 25 which is an end surface on the opposite side to the engine 16 interposing the cooling fan 17 with respect to the frame member 20. In this case, the oil cooler 28 and the radiator 30 are arranged with the desired interval dimension from the cooling fan 17 so that they do not interfere with the cooling fan 17 and can receive the cooling air by the cooling fan 17 on the entirety.

On the other hand, once the heat exchanging device 19 is mounted on the revolving frame 5, a mounting work of the support member 33 is started. In this case, the support member 33 is arranged so that the left front leg part 35 and the left rear leg part 36 are placed across the engine 16 in the front and rear direction, and the support member fixing bolt 37 inserted into the bolt insertion hole 35D of the left front leg part 35 is screwed with the female screw hole 10B provided in the partition plate 10 of the revolving frame 5. As a result, the left front leg part 35 can be mounted on the partition plate 10 of the revolving frame 5.

On the other hand, in the left rear leg part 36, the support member fixing bolt 37 inserted into the bolt insertion hole 36A is screwed with the female screw hole 11A1 provided in the left rear endplate 11A of the left rear vertical plate 11. As a result, the left rear leg part 36 can be mounted on the left rear vertical plate 11 of the revolving frame 5.

In this state, the free end 34F side of the housing support base 34 can be arranged on the frame member 20 of the heat exchanging device 19. Then, the support member fixing bolt 37 is inserted into the bolt insertion hole 24C provided in the mounting plate portion 24A1 of the upper frame 24 of the frame member 20 from the lower side, and this fixing bolt 37 is screwed with the female screw hole 34B1 provided in the lower plate 34B of the housing support base 34. As a result, the free end 34F side of the housing support base 34 can be fixed to the upper surface side of the frame member 20, and the support member 33 can be stably mounted on the revolving frame 5 by using the frame member 20 as the right side leg part.

Subsequently, as shown in FIG. 4, when the canopy 42 is to be mounted, the rear mounting plate 42A is placed on the housing support base 34 of the support member 33, and the front mounting plate 42E is placed on the floor mounting member 14 of the revolving frame 5. In this state, the canopy fixing bolt 43 inserted into each of the bolt insertion holes 42A1 of the rear mounting plate 42A is screwed with each of the female screw holes 34A1 of the upper plate 34A of the housing support base 34. As a result, the rear side of the canopy 42 can be mounted on the support member 33. On the other hand, the canopy fixing bolt 43 inserted into the bolt insertion hole 42E1 of the front mounting plate 42E is screwed with the female screw hole 14A of the floor mounting member 14. As a result, the right front side of the canopy 42 can be mounted on the revolving frame 5.

As described above, according to this embodiment, the cooling fan 17 mounted on the output shaft of the engine 16 is disposed so that each of the blades 17B enters into the frame member 20 from the engine side end surface 20A (shroud 31) of the frame member 20 by approximately a half in the axial direction dimension with respect to the frame member 20 of the heat exchanging device 19. On the other hand, the oil cooler 28 and the radiator 30 are mounted on the mounting surface plate 25 which is the end surface on the opposite side to the frame member 20 in the state with the desired interval dimension from the cooling fan 17.

With the arrangement structure as above, it is constituted such that the shroud 31 surrounding the outer periphery of each blade 17B of the cooling fan 17 is mounted on the engine side end surface 20A of the frame member 20. As a result, this shroud 31 can form the fan accommodating chamber 32 among the frame member 20, the oil cooler 28, and the radiator 30. With this constitution, interference among the cooling fan 17, the oil cooler 28, and the radiator 30 can be prevented and moreover, the cooling air by the cooling fan 17 can be supplied to the entireties of the oil cooler 28 and the radiator 30.

Therefore, it is only necessary that the shroud 31 has a shape that can cover the gap between the cooling fan 17 and the frame member 20, and it can be formed having a simple flat plate shape. As a result, since the shape of the shroud 31 is simplified, the size, the weight, and the manufacturing cost of the heat exchanging device 19 can be reduced and moreover, assembling workability, the maintenance workability and the like can be improved.

Moreover, the shroud 31 can be easily manufactured only by machining the circular opening 31A for surrounding the cooling fan 17, the bolt insertion holes 31B and the like in the rectangular plate body. Moreover, since the shroud 31 is constituted to have its periphery detachably fixed to the frame member 20 by using the shroud fixing bolt 31C, the cleaning work and the inspection work of the oil cooler 28 and the radiator 30 and the replacement work of the fan belt (not shown) rounded to the output shaft of the engine 16 and the like can be performed easily.

On the other hand, since the frame member 20 of the heat exchanging device 19 is for supporting the oil cooler 28 and the radiator 30, it has rigidity and can support a heavy article. On the other hand, the support member 33 is constituted by the housing support base 34 provided by extending on the upper side of the engine 16 in the left and right direction and the left front leg part 35 and the left rear leg part 36 having the upper ends mounted at the left side positions of the housing support base 34 in the left and right direction and the lower ends mounted on the revolving frame 5 across the engine 16 in the front and rear direction. As a result, in the housing support base 34 of the support member 33, the right side in the left and right direction is formed as the free end 34F. In addition, the support member 33 is constituted such that the free end 34F of this housing support base 34 is mounted on the frame member 20 of the heat exchanging device 19.

Therefore, even if the leg part on the right side (heat exchanging device 19 side) in the left and right direction is omitted and each of the leg parts 35 and 36 is provided only on the left side in the left and right direction, the support member 33 can stably support the housing support base 34 in the state supported on the both sides by each of the leg parts 35 and 36 on the left side and the frame member 20 on the right side by using the frame member 20 of the heat exchanging device 19.

As a result, when the support member 33 is to be mounted on the revolving frame 5, by mounting each of the leg parts 35 and 36 located on the fixed end 34E of the housing support base 34 on the revolving frame 5, and by mounting the free end 34F side of the housing support base 34 on the frame member 20 of the heat exchanging device 19, the support member 33 can be mounted on the revolving frame 5. As a result, the number of work processes when the support member 33 is mounted on the revolving frame 5 can be reduced, and assembling workability can be improved. Moreover, the installation space on the revolving frame 5 can be effectively used for a portion of omission of the leg part on the right side, and the size of the upper revolving structure 3 can be reduced. Furthermore, since the weight of the support member 33 can be reduced for a portion of omission of the leg part on the right side, the weight of the hydraulic excavator 1 can be reduced.

On the other hand, the frame member 20 of the heat exchanging device 19 is formed having a square frame body by using the lower frame 21, each of the side frames 22 and 23, and the upper frame 24. As a result, the free end 34F of the housing support base 34 constituting the support member 33 can be mounted on the upper surface side of the upper frame 24 by using the support member fixing bolt 37. In this case, as compared with the case in which the lower end of the leg part is mounted on the revolving frame 5, the free end 34F of the housing support base 34 can be mounted not on a deep lower part but at an upper part position which can be easily reached. In this point, the assembling workability can be improved.

Moreover, since the frame member 20 of the heat exchanging device 19 can be used as the right side leg part of the support member 33, the housing support base 34 can be firmly supported by using this frame member 20. As a result, supporting strength of the canopy 42 against rollover, falling, a collision of a dropped object and the like can be improved, and reliability of the hydraulic excavator 1 can be improved.

According to this embodiment, the case in which the oil cooler 28 and the radiator 30 are mounted on the mounting surface plate 25 of the frame member 20 through the respective brackets 26 and 29 is described as an example. However, the present invention is not limited thereto and if the desired interval dimension can be ensured among the oil cooler 28, the radiator 30 and the cooling fan 17, for example, it may be so constituted that the oil cooler 28 and the radiator 30 are arranged in a state a part of each of them enters into the frame member 20 beyond the mounting surface plate 25 constituting the end surface on the opposite side to the engine 16.

According to the embodiment, the case in which the oil cooler 28 and the radiator 30 are provided in the heat exchanging device 19 is described as an example. However, the present invention is not limited thereto, and it may be so constituted that other than the oil cooler 28 and the radiator 30, an intercooler, a condenser of an air conditioning device, a fuel cooler and the like, for example, are provided.

According to the embodiment, the case in which the three-column type canopy 42 including the three columns 42B to 42D is provided as the housing is exemplified. However, the present invention is not limited to that, it may be so constituted that a canopy including one, two or four or more leg parts is used as the housing. On the other hand, a cab covering the periphery and the upper part of the operator's seat 39 can be also applied as the housing.

In the embodiment, the crawler-type small-sized hydraulic excavator 1 is described as an example of a construction machine. However, the present invention is not limited to that and it may be applied to a small-sized hydraulic excavator including a wheel-type lower traveling structure, for example. Moreover, it can be widely applied to other construction machines such as a small-sized hydraulic crane and the like.

DESCRIPTION OF REFERENCE NUMERALS

1: Hydraulic excavator (Construction machine)
2: Lower traveling structure
3: Upper revolving structure
4: Working mechanism
5: Revolving frame
16: Engine
17: Cooling fan
17A: Hub member
17B: Blade
18: Hydraulic pump
19: Heat exchanging device
20: Frame member
20A: Engine side end surface
21: Lower frame
22: Front side frame
23: Rear side frame
24: Upper frame
25: Mounting surface plate
27A to 27D, 31C, 37, 43: Fixing bolt
28: Oil cooler
30: Radiator
31: Shroud
31A: Circular opening
32: Fan accommodating chamber
33: Support member
34: Housing support base
34E: Fixed end
34F: Free end
35: Left front leg part
36: Left rear leg part

The invention claimed is:

1. A construction machine comprising:
an automotive lower traveling structure;
an upper revolving structure rotatably mounted on said lower traveling structure; and
a working mechanism provided on a front side of said upper revolving structure, capable of moving upward/downward; wherein
said upper revolving structure comprises:
a revolving frame forming a support structural body;
an engine mounted on a rear side of said revolving frame in a laterally placed state extending in a left and right direction;
a cooling fan having a plurality of blades around a hub member located on one side of said engine in the left and right direction and mounted on an output shaft of said engine and generating cooling air by being driven by said engine;
a hydraulic pump provided on the other side of said engine in the left and right direction and supplying hydraulic oil to a hydraulic actuator by being driven by said engine; and
a heat exchanging device including an oil cooler provided on said revolving frame so as to face said cooling fan and cooling said hydraulic oil, and a radiator for cooling coolant of said engine, characterized in that:
a support member formed of a housing support base extending on an upper side of said engine in the left and right direction and having one side which is a free end in the left and right direction and formed of front and rear leg parts each having an upper end mounted at a position on the other side of said housing support base in the left and right direction and a lower end mounted on said revolving frame across said engine in the front and rear direction is provided on said revolving frame;
said heat exchanging device includes a frame member assembled having a square frame shape by using a lower frame located on a lower side, extending in a front and rear direction of said upper revolving structure and mounted on said revolving frame, a pair of side frames extending to an upper side from both ends of said lower frame in a length direction, and an upper frame extending in the front and rear direction on an upper part of each of said side frames;
said housing support base of said support member having one side which is said free end in the left and right direction is mounted on an upper surface side of said upper frame constituting said frame member of said heat exchanging device;
said cooling fan is disposed in a state in which each of said blades enters into said frame member from an end surface on said engine side with respect to said frame member;

said oil cooler and said radiator are mounted on an opposite side to said engine interposing said cooling fan with respect to said frame member; and a flat plate shaped shroud surrounding an outer periphery of each of said blades of said cooling fan and forming a fan accommodating chamber among said frame member, said oil cooler, and said radiator is provided on said engine side end surface of said frame member.

2. The construction machine according to claim 1, wherein said shroud is formed as a rectangular plate body having a circular opening for surrounding said cooling fan, and a periphery of said shroud is detachably attached to said engine side end surface of said frame member.

* * * * *